US006781517B2

(12) United States Patent
Moster et al.

(10) Patent No.: US 6,781,517 B2
(45) Date of Patent: *Aug. 24, 2004

(54) COMMUNICATION AND BED FUNCTION CONTROL APPARATUS

(75) Inventors: Jeffrey A. Moster, Cincinnati, OH (US); Robert M. Zerhusen, Cincinnati, OH (US); Michael W. Hamilton, West Harrison, IN (US); David W. Hornbach, Brookville, IN (US); Scott M. Corbin, Sunman, IN (US); Stephane Rivallant, Pornichet (FR)

(73) Assignee: Hill-Rom Services, Inc., Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/303,196

(22) Filed: Nov. 25, 2002

(65) Prior Publication Data

US 2003/0076238 A1 Apr. 24, 2003

Related U.S. Application Data

(63) Continuation of application No. 09/291,882, filed on Apr. 14, 1999, now Pat. No. 6,486,792.
(60) Provisional application No. 60/081,698, filed on Apr. 14, 1998.

(51) Int. Cl.[7] .......... H04Q 9/00

(52) U.S. Cl. .......... 340/825.19; 340/286.07; 5/425; 5/430; 5/503.1; 297/411.2

(58) Field of Search .......... 340/825.19, 286.07; 5/425, 430, 503.1; 297/411.2

(56) References Cited

U.S. PATENT DOCUMENTS

| | | | |
|---|---|---|---|
| 1,915,985 | A | 6/1933 | Edwards |
| 2,208,945 | A | 7/1940 | Miller |
| 2,384,325 | A | 9/1945 | Marsan |
| 2,439,009 | A | 4/1948 | Kujawski |
| 2,605,155 | A | 7/1952 | Lewis |
| 2,607,881 | A | 8/1952 | Anderson |
| 3,030,128 | A | 4/1962 | Versen |
| 3,112,968 | A | 12/1963 | Cotton et al. |
| 3,200,416 | A | 8/1965 | Warrick |
| 3,243,497 | A | 3/1966 | Kendall et al. |
| 3,358,957 | A | 12/1967 | Lindenmuth |
| 3,662,981 | A | 5/1972 | Hogrebe |
| 3,757,363 | A | 9/1973 | Langlais |
| 3,798,684 | A | 3/1974 | Benoit et al. |
| 3,839,753 | A | 10/1974 | Benoit et al. |
| 3,875,356 | A | 4/1975 | Heim et al. |
| 3,889,914 | A | 6/1975 | Torme |
| 3,977,645 | A | 8/1976 | Deely |

(List continued on next page.)

FOREIGN PATENT DOCUMENTS

| | | |
|---|---|---|
| CA | 789207 | 7/1968 |
| DE | 2 037 932 | 2/1972 |
| DE | 32 40 145 C2 | 5/1984 |

(List continued on next page.)

OTHER PUBLICATIONS

Hill–Rom, "A Hill–Rom Solution TotalCare® Bed System" brochure, 2000.
Hill–Rom, TotalCare® Bed System Service Manual, pp. i through iii, pp. 1–18 through 1–69, pp. 3–44 through 3–51, pp. 4–11 through 4–16, pp. 4–80 through 4–81, and p. 6–5, Nov. 1997–Jan. 2002.

(List continued on next page.)

*Primary Examiner*—Ario Etienne
*Assistant Examiner*—Yves Dalencourt
(74) *Attorney, Agent, or Firm*—Bose McKinney & Evans LLP

(57) ABSTRACT

A communication and control apparatus includes a control unit having a surface accessible to a person on a bed, the control unit being coupled to a portion of the bed.

41 Claims, 15 Drawing Sheets

U.S. PATENT DOCUMENTS

| | | | | |
|---|---|---|---|---|
| 4,023,757 | A | 5/1977 | Allard et al. | |
| 4,183,015 | A | 1/1980 | Drew et al. | |
| 4,183,489 | A | 1/1980 | Copher et al. | |
| 4,287,620 | A | 9/1981 | Zur | |
| 4,410,158 | A | 10/1983 | Maffei | |
| 4,435,862 | A | 3/1984 | King et al. | |
| 4,453,695 | A | 6/1984 | Sennott et al. | |
| 4,465,255 | A | 8/1984 | Hill | |
| 4,484,367 | A | 11/1984 | Jenkins | |
| 4,489,454 | A | 12/1984 | Thompson | |
| 4,591,124 | A | 5/1986 | Hellenbrand et al. | |
| 4,612,679 | A | 9/1986 | Mitchell | |
| 4,680,790 | A | 7/1987 | Packard et al. | |
| 4,780,919 | A | 11/1988 | Harrison | |
| 4,803,744 | A | 2/1989 | Peck et al. | |
| 4,821,348 | A | 4/1989 | Pauna | |
| 4,846,434 | A | 7/1989 | Krogsrud | |
| 5,023,967 | A | 6/1991 | Ferrand | |
| 5,072,906 | A | 12/1991 | Foster | |
| 5,100,091 | A | 3/1992 | Pollak | |
| 5,186,337 | A | 2/1993 | Foster et al. | |
| 5,211,367 | A | 5/1993 | Musculus | |
| 5,230,289 | A | 7/1993 | George et al. | |
| 5,239,300 | A | 8/1993 | Berger et al. | |
| 5,255,403 | A | 10/1993 | Ortiz | |
| 5,279,010 | A | 1/1994 | Ferrand et al. | |
| 5,335,313 | A | 8/1994 | Douglas | |
| 5,335,384 | A | 8/1994 | Foster et al. | |
| 5,416,839 | A | 5/1995 | Lee | |
| 5,465,082 | A | 11/1995 | Chaco | |
| 5,479,666 | A | 1/1996 | Foster et al. | |
| 5,542,136 | A | 8/1996 | Tappel | |
| 5,542,138 | A | 8/1996 | Williams et al. | |
| 5,592,153 | A | 1/1997 | Welling et al. | |
| 5,594,963 | A | 1/1997 | Berkowitz | |
| 5,611,096 | A | 3/1997 | Bartlett et al. | |
| 5,715,548 | A | 2/1998 | Weismiller et al. | |
| 5,732,423 | A | 3/1998 | Weismiller et al. | |
| 5,838,223 | A | 11/1998 | Gallant et al. | |
| 6,147,592 | A | 11/2000 | Ulrich et al. | |
| 6,163,903 | A | 12/2000 | Weismiller et al. | |
| 6,182,310 | B1 | 2/2001 | Weismiller et al. | |
| 6,336,235 | B1 | 1/2002 | Ruehl | |
| 6,486,792 | B1 * | 11/2002 | Moster et al. ......... | 340/825.19 |

FOREIGN PATENT DOCUMENTS

| | | | |
|---|---|---|---|
| DE | 33 10 463 | A1 | 9/1984 |
| DE | 33 14938 | A1 | 10/1984 |
| DE | 86 14 525.8 | | 12/1986 |
| DE | 41 27 013 | A1 | 2/1993 |
| DE | 41 27 014 | A1 | 2/1993 |
| DE | 42 14 143 | A1 | 11/1993 |
| EP | 0 363 555 | A2 | 4/1990 |
| EP | 0 376 066 | A1 | 7/1990 |
| EP | 0 568 020 | A3 | 4/1997 |
| EP | 0 780 111 | A1 | 6/1997 |
| WO | WO 96/33641 | | 10/1996 |

OTHER PUBLICATIONS

Prentke Romich Company brochure entitled “Hospital Environmental Control System”.

6/83 Prentke Romich Company brochure entitled “Hospital Environmental Control System (HECS)”.

Prentke Romich Company Operator’s Manual for HECS–2 Hospital Environmental Control System.

Prentke Romich May 20, 1985 blueprint Hospital Environmental Control System HECS–2.

Joerns Healthcare’s color marketing brochure entitled ROOMATE.

Joerns Healthcare’s brochure entitled ROOMATE.

Sunrise Medical Roomate™ Installation Instructions for Joerns 670.

Prentke Romich’s Operational Guide for HECS–5 Hospital Environmental Control System.

Prentke Romich Aug. 8, 1988 blueprint “Hill–Rom Century Bed Frame Mount for HECS”.

Prentke Romich’s Operational Guide for HECS–3 Hospital Environmental Control System.

Prentke Romich 7/90 blueprint “HECS–1 Mounting System Assembly”.

Prentke Romich blueprint “HECS–1 Bed Mount Bracket”.

Prentke Romich 4/90 blueprint “HECS–1 Mounting Arm”.

HECS–1 Hospital/Home Environmental Control System Operational Manual.

Joerens Oct. 24, 1986 blueprint “Flexarm Assembly”.

Joerens Jan. 19, 1987 blueprint “Flexarm Sub–Assembly”.

Color photographs of Joerens Roomate™ Device.

Joerens “670 Acute Care Hospital Bed” color brochure.

Prentke Romich 5/90 blueprint “HECS–1 Transmitter Assembly”.

Prentke Romich Company, Hospital/Home Environmental Control System Product Brochure.

1990 Crest Brochure.

HiMed Patiententerminal MediSET, Siemens.

* cited by examiner

COMMUNICATION AND BED FUNCTION CONTROL APPARATUS

CROSS-REFERENCE TO RELATED APPLICATIONS

This application is a continuation of U.S. patent application Ser. No. 09/291,882, filed Apr. 14, 1999, now U.S. Pat. No. 6,486,792, which claims the benefit of U.S. provisional application Serial No. 60/081,698, filed Apr. 14, 1998, the disclosures of which are expressly incorporated by reference herein.

BACKGROUND AND SUMMARY OF THE INVENTION

The present invention relates to a communication and bed function control apparatus for a hospital bed. More particularly, the present invention relates to a controller which is coupled to a hospital bed frame or to a siderail on the bed to improve access to controls by a person located on the bed.

Several types of controllers are known in the healthcare industry which permit a person located on a hospital bed to activate a number of communication and control functions, such as adjusting the bed, adjusting the mattress, calling the nurse, adjusting the room light or reading light, controlling the T.V. or audio functions, or controlling the telephone. See, for example, U.S. Pat. Nos. 5,592,153; 5,239,300; 5,542,138; and 4,680,790. These controllers typically include one or more push-button or pressure sensitive switches, or voice activated controls, to activate various communication and control functions.

According to one illustrated embodiment of the present invention, a communication and control apparatus is provided for use by person located on a bed to control at least one function, the bed including a frame, a patient support surface supported by the frame, and a siderail coupled to the frame and configured to extend above the patient support surface. The apparatus includes a control unit including a receiving portion and configured to control the at least one function. An extendable arm includes a first end pivotally coupled to the siderail and a second end pivotally coupled to the control unit, the arm being configured to support the control unit above the patient support surface. The arm is configured to be received within the receiving portion of the control unit when in a storage position, and the arm is configured to extend away from the receiving portion of the control unit when in an extended position.

Illustratively, the control unit is configured to removably couple to the siderail when in the storage position. Further illustratively, the siderail includes a first rail vertically spaced apart from a second rail, and the control unit includes receiving portions configured to removably receive portions of the first rail and the second rail when the control unit is in the storage position. Illustratively, the control unit further includes a receiving portion configured to receive the arm when the control unit is in the storage position.

Illustratively, the side rail includes an opening and the control unit includes control buttons which are accessible through the opening such that a health care provider positioned adjacent the bed is provided access to the control buttons when the control unit is in the storage position.

According to a further illustrated embodiment of the present invention, a communication and control apparatus is provided for use by a person located on a bed to control at least one function, the bed including a frame, and a patient support surface supported by the frame. The apparatus includes a siderail coupled to the frame and configured to extend above the patient support surface, the siderail defining a recessed portion. A control unit is configured to control the at least one function, the control unit being removably receivable in the recessed portion. An arm having a first end and a second end is configured to support the control unit above the patient support surface. A first connection is configured to operably connect the first end of the arm to the siderail and a second connection is configured to operably connect the second end of the arm to the control unit. The first connection and the second connection cooperate to permit movement of the control unit and the arm from a storage position within the recessed portion in the siderail to an extended position extending away from the siderail.

Illustratively, the control unit includes a first side and an opposing second side, the first side including a first control button positioned to face a patient located on the patient support surface and configured to actuate the at least one function, the second side including a second control button configured to control the at least one function. The second control button is accessible through an opening in the siderail to a health care provider positioned adjacent the bed when the control unit is in the storage position.

In a further illustrated embodiment of the present invention, a communication and control apparatus is provided for use by a person located on a bed to control at least one function, the bed including a frame, a patient support surface supported by the frame, and a siderail coupled to the frame and configured to extend above the patient support surface. The apparatus includes a housing having a first side facing a first direction and a second side facing a second direction generally opposite the first direction, the housing being movable between a first portion removably coupled to the siderail and a second position detached from the siderail. A switch is supported by the first side and configured to control the at least one function. A communication device is supported by the second side, the communication device being inactive in the first position and active in the second position. A communication link extends between the control unit and the siderail.

Illustratively, the communication link comprises a cord attached on a first end of the control unit and attached on a second end to the siderail, the cord being configured to carry a signal from the control unit to a signal receiving unit on the bed.

Further illustratively, the communication device comprises a telephone.

A further illustrated embodiment of the present invention comprises a communication and control apparatus for use by a person located on a patient support surface of a bed, the apparatus including a control unit having a switch configured to control one of the bed and another piece of equipment, a device coupled to the control unit and configured to facilitate voice communication with another person, and a cord coupled to the control unit and to a location on the bed, the cord having sufficient length to allow the control unit to be moved between a plurality of positions on the patient support surface.

Illustratively, the device configured to facilitate voice communication with another person is a telephone.

Further illustratively, the device configured to facilitate voice communication with another person is an intercom.

Illustratively, the switch is positioned on a first side of the control unit and the device configured to facilitate voice communication with another position is positioned on a second side of the control unit.

According to yet another illustrated embodiment of the present invention, a communication and control apparatus is provided for use by a person located on a bed to control at least one function, the bed including a frame, a patient support surface supported by the frame. The apparatus includes a siderail coupled to the frame and configured to extend above the patient support surface, the siderail including substantially vertical first and second members defining a gap. A control unit is configured to control the at least one function, the control unit configured to be removably received within the gap and provide a portion of the siderail. An arm having a first end and a second end is configured to support the control unit above the patient support surface. The first end and the second end of the arm cooperate to permit movement of the control unit and the arm from a first position wherein the control unit is received within the gap in the siderail to a second position where the control unit and the arm extend away from the siderail.

Illustratively, the first and second members of the siderail each include a channel configured to removably receive the control unit.

In a further illustrated embodiment of the present invention, a control apparatus is provided for use by a person located on the bed to control at least one function, the bed including a frame, and a patient support surface supported by the frame. The apparatus includes a control unit configured to control the at least one function, and a selection switch configured to select the at least one function, the switch coupled to the control unit. The handle portion includes a longitudinal axis and is coupled to the control unit for rotation about the longitudinal axis and configured to control the function selected using the selection switch.

Additional features of the invention will become apparent to those skilled in the art upon consideration of the following detailed description of illustrated embodiments exemplifying the best mode of carrying out the invention as presently perceived.

BRIEF DESCRIPTION OF THE DRAWINGS

The detailed description particularly refers to the accompanying drawings in which.

DETAILED DESCRIPTION OF THE DRAWINGS

Figure 1:
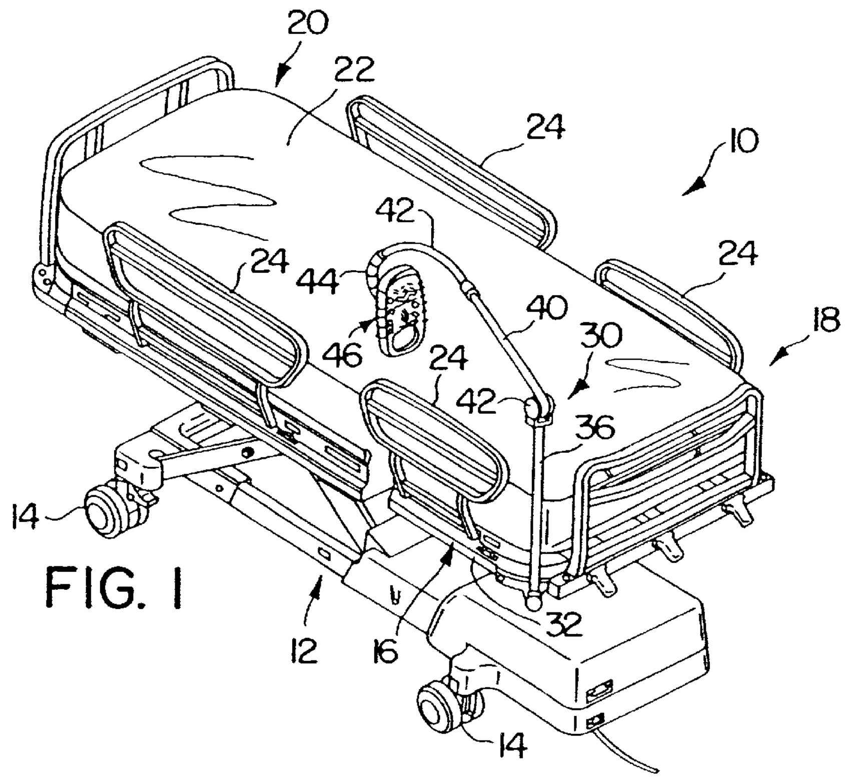
FIG. 1 is a perspective view illustrating a hospital bed with a communication and bed function control apparatus mounted to a frame of the bed adjacent a head end of the bed.
Figure 2:
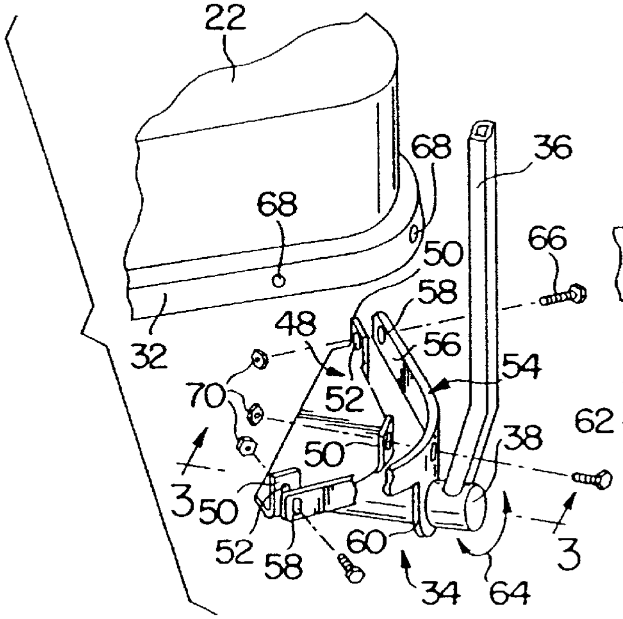
FIG. 2 is an exploded perspective view illustrating an attachment mechanism used to couple an arm assembly of the control apparatus to a corner of the frame of the hospital bed.
Figure 3:
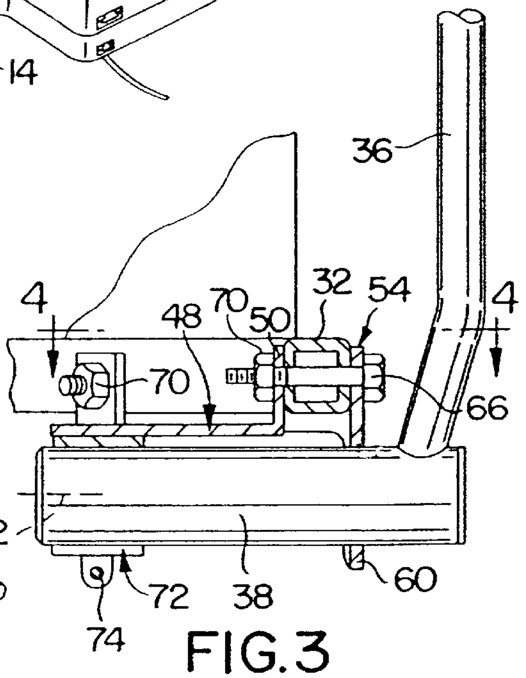
FIG. 3 is a sectional view taken along lines 3—3 of FIG. 2.
Figure 4:
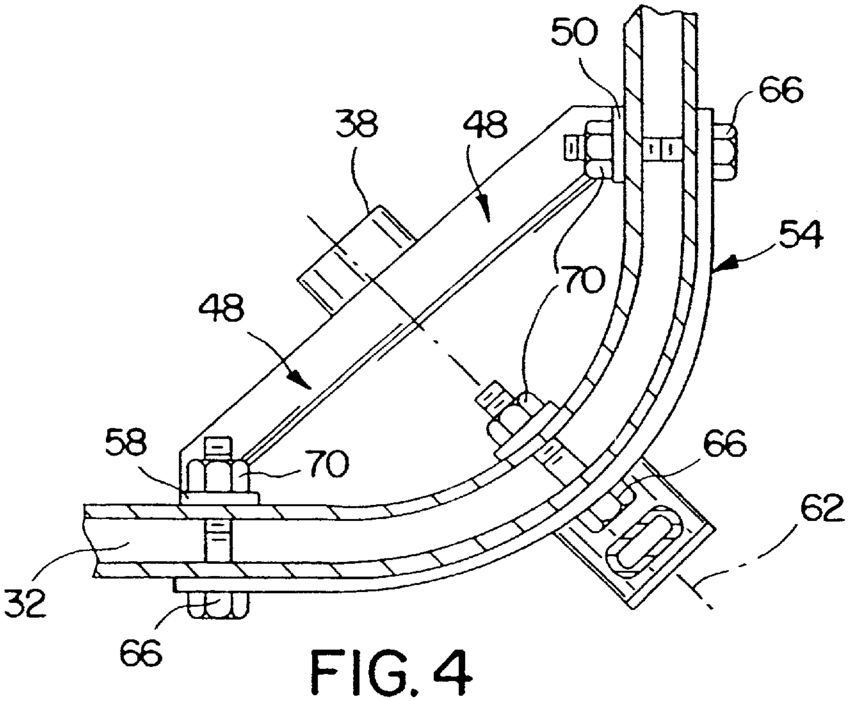
FIG. 4 is a sectional view taken along lines 4—4 of FIG. 3 illustrating further details of the attachment mechanism.

Referring now to the drawings, FIG. 1 illustrates a hospital bed 10 having a base frame 12 and casters 14 coupled to the base frame 12. An articulating support deck 16 is coupled to the base frame 12 in a conventional manner. It is understood that the control units of the present invention may be used with any type of bed configuration. The illustrated bed 10 includes a head end 18 and a foot end 20. A mattress 22 is located on the support deck 16 for supporting a person on the bed 10. Siderails 24 are located on opposite sides of the mattress 22 in a conventional manner.

FIG. 1 illustrates a communication and bed function control apparatus 30 mounted to an outer frame member 32 of the bed 10 by an attachment mechanism 34 as best illustrated in FIGS. 2–5. The communication and bed function control apparatus 30 further includes a first arm 36 connected to a pivot cylinder 38. A second arm 40 is coupled to first arm 36 by a pivot joint 42. A flexible tube 42 is coupled to second arm 40. A curved attachment portion 44 is coupled between the flexible portion 42 and a control unit 46.

Figure 5:
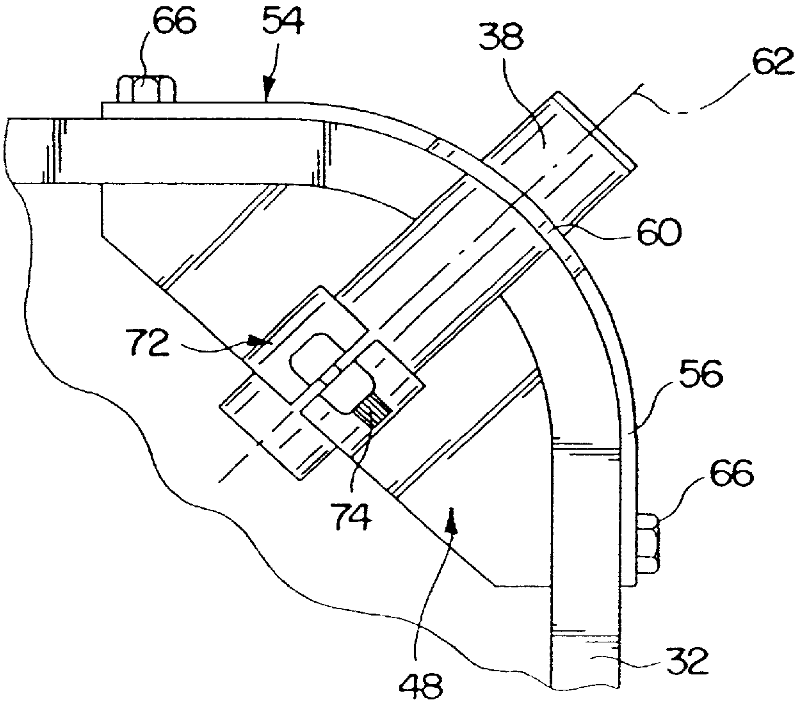
FIG. 5 is a bottom view of FIG. 4.

The attachment mechanism 34 shown in FIGS. 2–5 includes an inner mounting plate 48 having upturned tabs 50 which are formed to include apertures 52. Attachment mechanism 34 further includes an outer mounting plate 54 having a curved portion 56 formed to include mounting apertures 58. Outer mounting plate 54 further includes an extended support portion 60 having an aperture configured to receive the cylindrical member 38 so that cylindrical member 38 can pivot about a longitudinal axis 62 as shown by double-headed arrow 64 in FIG. 2. A bottom surface of inner mounting plate 48 includes a clamp 72 which is also configured to receive the cylindrical member 38 as shown in FIG. 5. An adjustment screw 74 is configured to adjust the tightness of clamp 72 on the cylindrical member 38. Clamp 72 is spaced apart from support portion 60 of the outer mounting plate 54 to hold the cylindrical member 38 for rotation about the longitudinal axis 62 as discussed above.

Fasteners such as bolts 66 are configured to extend through apertures 58 formed in outer mounting plate 50, through apertures 68 formed in frame member 32 of the bed 10, and through apertures 52 of inner mounting bracket 48 to secure the attachment mechanism 34 to the bed 10. Illustratively, nuts 70 hold the bolts 68 in place. It is understood that other types of fasteners including rivets, screws, clamps, etc. may be used to secure the attachment mechanism 34 to the bed 10.

Figure 7:
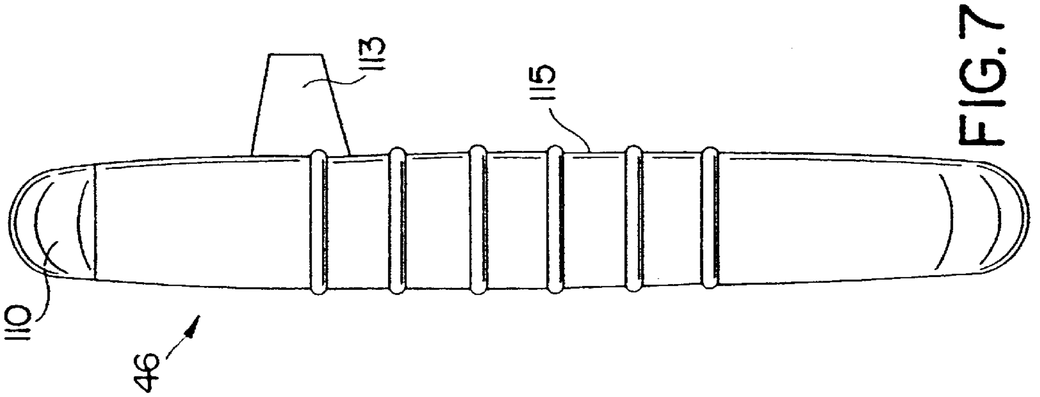
FIG. 7 is a side elevational view of the control unit of FIG. 6.
Figure 6:
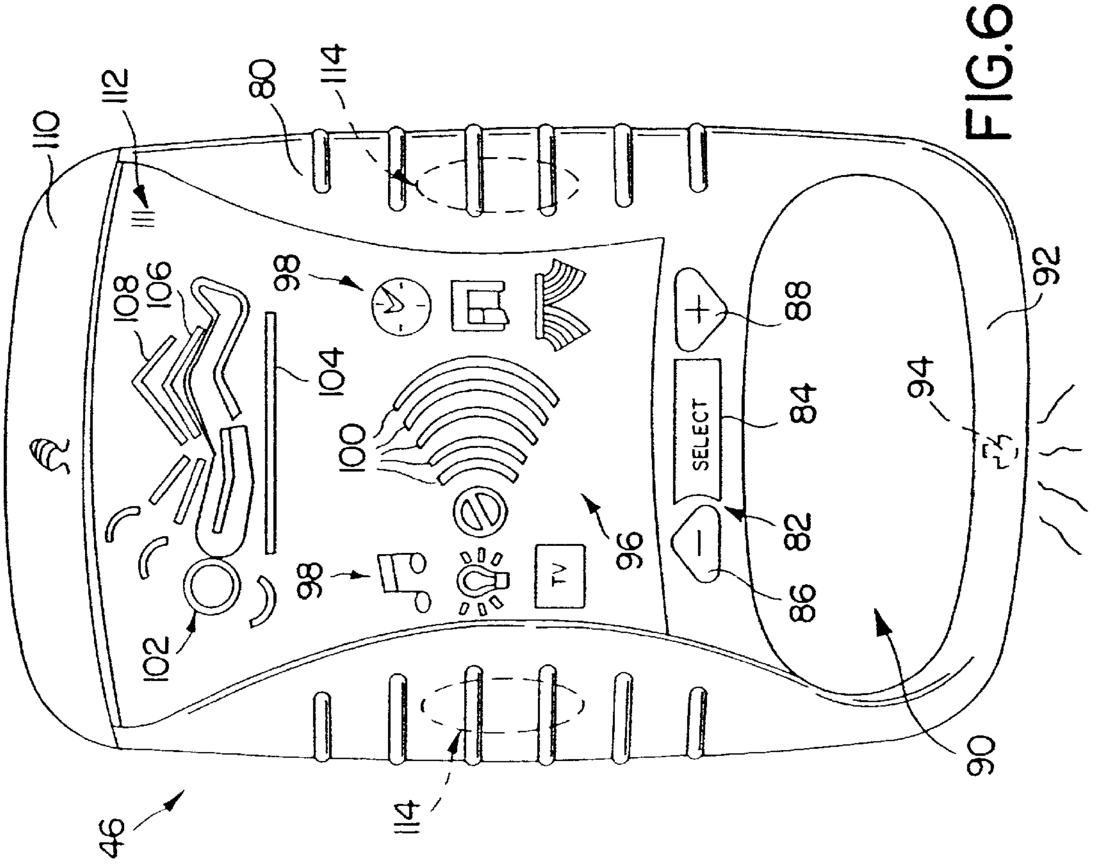
FIG. 6 is a front view of one embodiment of a control unit of the present invention.

The control unit 46 is further illustrated in FIGS. 6 and 7. The control unit 46 includes a body portion 80 having control buttons 82 including a "select" button 84, a "−" or down button 86, and a "+" or up button 88. Control unit 46 further includes a large aperture 90 configured to define a grip handle 92. A light 94 is located within the handle 92 to provide light for reading or other activities for the person on the bed 10. A modular control panel 96 includes indicators or icons 98 for the various control functions performed by the control unit 46. In addition, volume or level indicators 100 are also provided on the panel 96. Each of the icons and indicators 98 and 100 may be separately illuminated to provide an indication of which function is being controlled as discussed below.

The bed articulation control indicator 102 is also located on the panel 96. Separately illuminatable movement levels are shown at 104, 106, and 108. A nurse call button 110 extends across a top edge of the control unit 46. Nurse call button 110 may be illuminated or made from a different color material, if desired, to make the nurse call button 10 stand out from the remainder of the control unit 46. Illustratively, the nurse call button 110 is illuminated when it is activated. The location of the nurse call button 110 which extends substantially along an entire top edge of the control unit facilitates activation of the nurse call switch 110.

A microphone 112 is located on control panel 96 for phone use or for communicating with a remote nurse station. At least one speaker 114 illustratively is located within the control unit 46. Speakers 114 and microphone 112 permit hands-free use of the telephone or communications with the nurse station. The speakers 114 also provide radio and T.V. audio. A mounting bracket 113 is located on a rear surface 115 of control unit 46.

When the select button 84 is pressed, the controller scrolls through the various icons 98 on the control panel to provide a visual indication of which function is currently being controlled by the control unit 46. Once the particular icon 98 is illuminated, adjustments can be made using the up and down buttons 88 and 86.

Each time a select button 84 is pressed, the controller scrolls to the next function and highlights or illuminates the icon 98 corresponding to the function that is currently being controlled. An LED or other light source is used to provide illumination of the particular icon to provide the indication of the function being controlled. Once the radio icon, television icon, light control icon or other icon is illuminated, the up and down buttons 88 and 86 are pressed to adjust the volume, intensity of the light, etc. Individual level indicators 100 are then separately illuminated to provide an indication of the volume level or intensity level of the light, etc. When the bed functions 102 are selected, an operator presses the "+" up button 88 to raise the identified section of the bed 10. The "−" down button 86 is pressed to lower the identified section of the bed. Illustratively, buttons 84, 86 and 88 are momentary contact switches. Therefore, as long as the buttons 86 and 88 are held down, the bed function will continue to operate. When the buttons 86 and 88 are released, the bed function ceases to operate.

Figure 8:
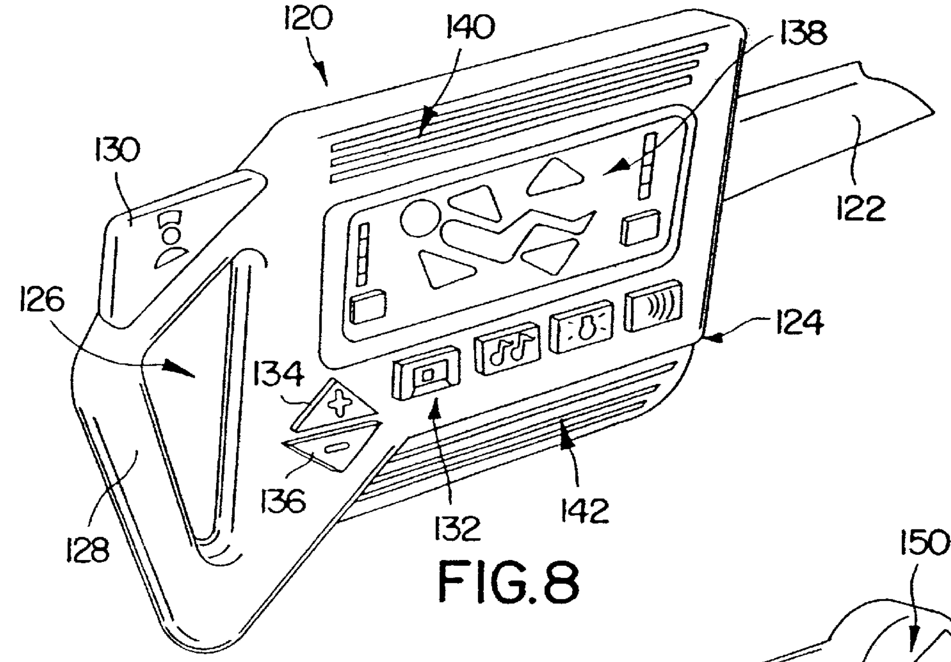
FIGS. 8–11 illustrate other embodiments of control units in accordance with the present invention.

Another embodiment of a control unit 120 is illustrated in FIG. 8. The control unit 120 is illustratively mounted on an arm 122 coupled to the bed 10 in any manner. It is understood that any attachment mechanism or number of arms may be used to mount the control unit 120 to the bed 10. Control unit 120 includes a body portion 124 formed to include an aperture 126 defining a grip handle 128 along a side of the control unit 120. A nurse call switch 130 is mounted to a top portion of handle 128. A nurse call switch 130 may be actuated by a thumb of the operator while the operator is gripping the handle 128. Nurse call switch 130 is illustratively illuminated when pressed. Control unit 120 includes individual buttons 132 for selecting the T.V., radio, lights, etc for control. Separate up and down buttons 134 and 136 are provided to control the selected function. Articulation control buttons 138 are separate from the other function buttons 132. The control unit 120 further includes a speaker 140 for hands-free telephone and nurse communication. A light 142 is located within the body portion 124 of control unit 120 adjacent a bottom surface.

Figure 9:
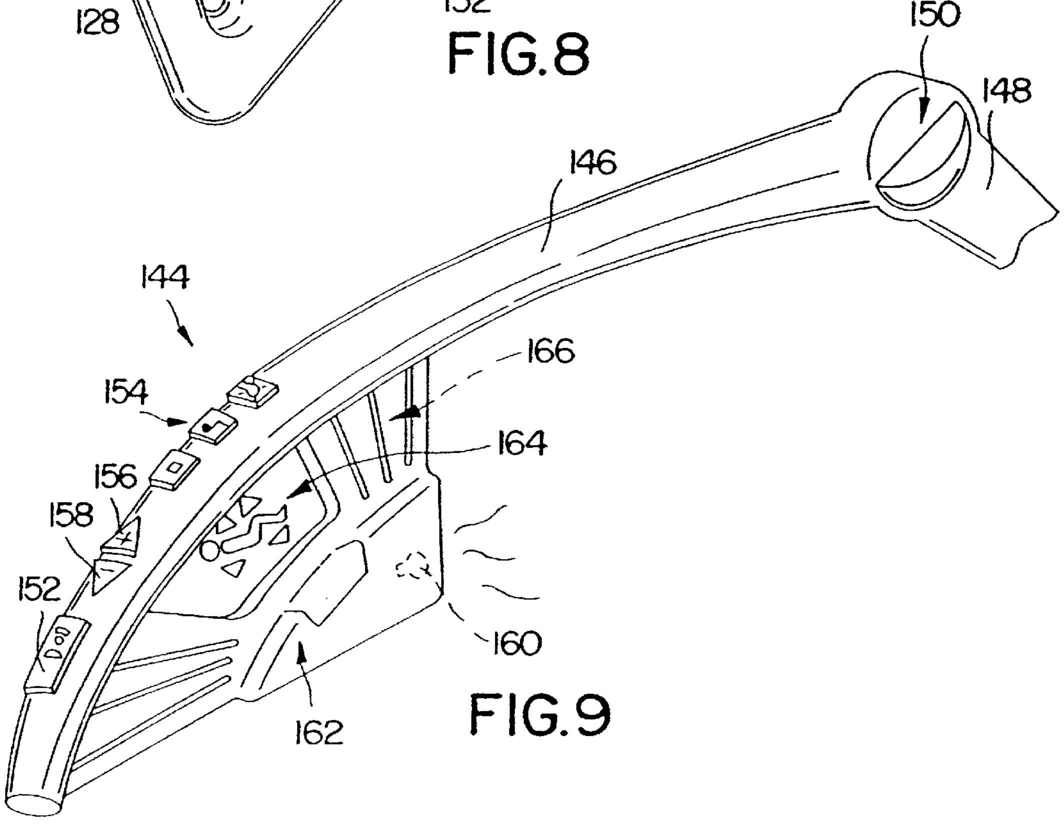

FIG. 9 illustrates yet another embodiment of a control unit 144. The control unit 144 includes a curved support arm 146 coupled to another arm 148 by a pivot connection 150. A nurse call button 152, function control switches 154 for the radio, T.V., bed operation, and lighting, and up and down control buttons 156 and 158 are located along a top surface of the arm 146. When a particular function switch 154 is selected, that selected function is controlled using up and down switches 156 and 158. A reading light 160 is located within a body portion 162 of the control unit 144 which extends downwardly from the arm 146. Body portion 162 further includes bed articulation controls 164. One or more speakers 166 are located within the body portion 162.

Figure 10:
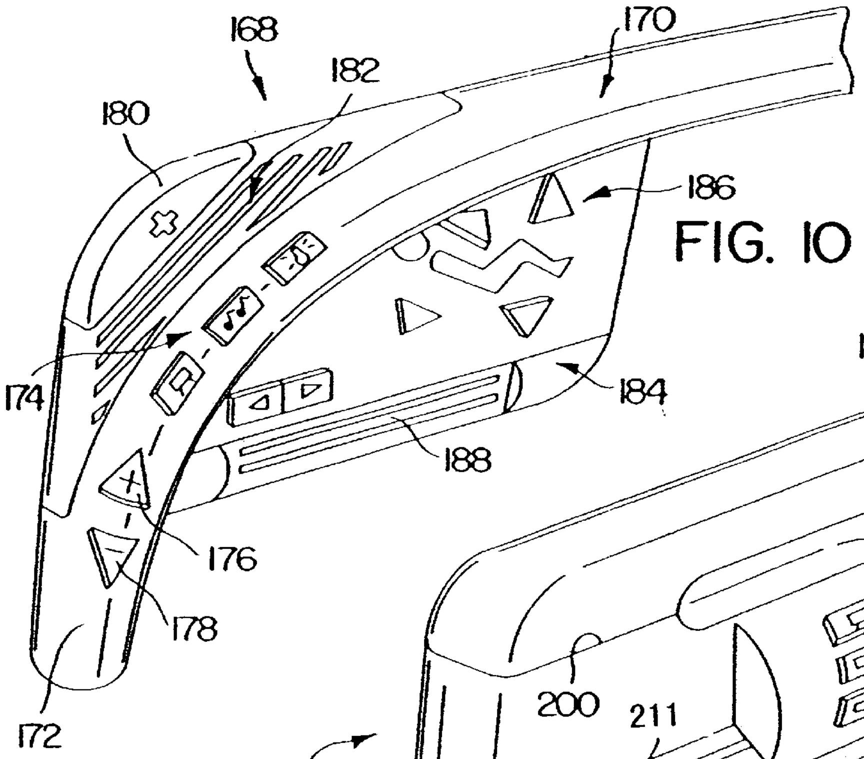

FIG. 10 illustrates still another control unit 168 of the present invention. The control unit 168 includes a curved support arm 170. A distal end 172 of arm 170 provides a grip handle for movement of the control unit 168. Function selection switches 174 for T.V., radio, lights, etc. are located on a front surface of the arm 170 facing the operator. Up and down control switches 176 and 178 are also located on the front surface of the control arm 170 for easy access. A nurse call switch 180 is located on a corner portion of the arm 170. A speaker 182 for hands-free telephone use is located below the nurse call switch 180 within the arm 170. A body portion 184 is coupled to the arm 170. Body portion 184 includes bed articulation controls 186 and a light 188.

Figure 11:
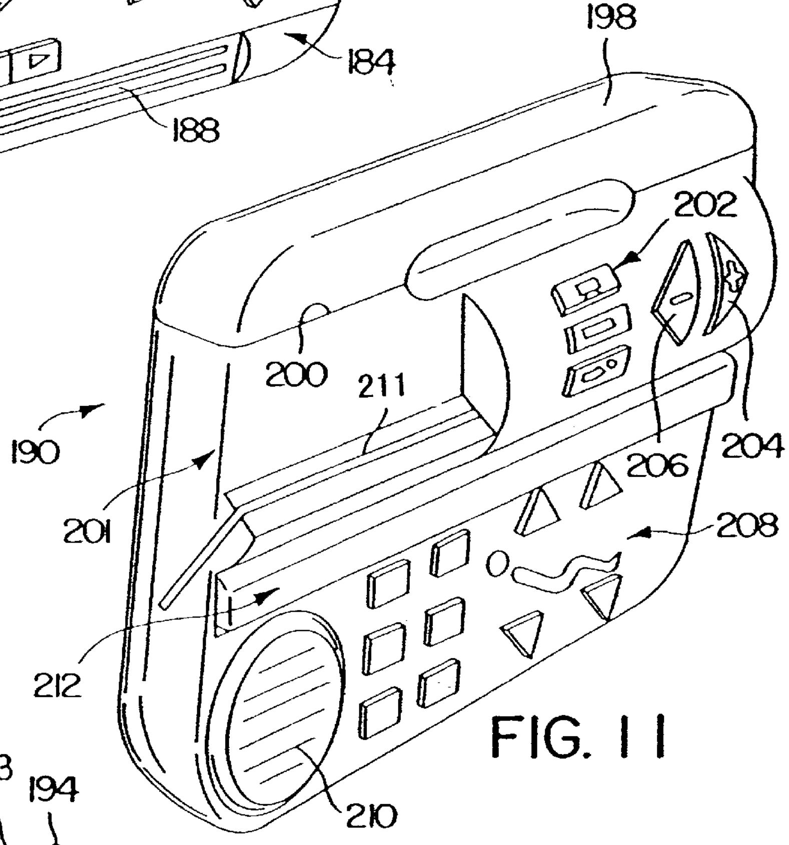
Figure 12:
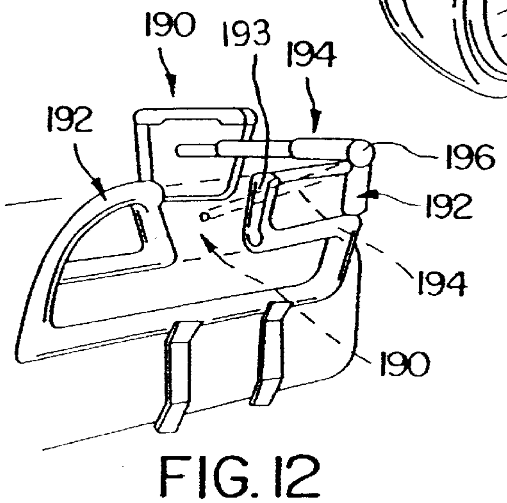
FIG. 12 illustrates the control unit of FIG. 11 mounted to a siderail of a bed with a pivoting and telescoping arm mounting assembly.

Still another control unit 190 is illustrated in FIGS. 11 and 12. Control unit 190 is illustratively movable from a first position illustrated by dotted lines 190 in FIG. 12 in which the control unit 190 provides a central portion of a siderail 192. In other words, the control unit 190 fits within a gap formed between spaced-apart portions of the siderail 192 when the control unit is in a first storage position. Channels 193 may be formed on the siderail 192 to removably receive the control unit 190. The control unit 190 is coupled to a portion of the siderail 192 by a mounting arm 194 and a pivot connection 196 which is coupled to siderail 192. Pivot connection 196 and arm 194 are movable to the position shown in FIG. 12 so that the control unit 190 moves away from the siderail 192. The arm 194 is a telescoping arm to permit adjustment of the location of the control unit 190. Control unit 190 is rotatably coupled to an end of the arm 194. Arm 194 can also pivot away from the bed 10 so that the control unit 190 may be used from outside the bed, such as when an operator is located in a chair next to the bed. The control unit 190 is typically stored in the siderail 192 and is moved outwardly only when desired.

A telephone handset 198 is positioned along top surface 200 of the control unit 190. Control unit 190 includes a body portion 201. Separate function selection switches 202 are provided for the T.V., radio, lights, etc. Up and down control switches 204 and 206 are located adjacent the function selection switches 202. Bed articulation control switches 208 are also located on the body portion 201. A card reader slot 211 is provided on the body portion 201. The card reader 211 is used to read a phone card, credit card, or debit card for using the T.V. or telephone. In addition, the reader 211 may be a smart card reader for reading information available on a conventional smart card. A nurse call button 212 extends along the entire front of body portion 201.

Figure 13A:
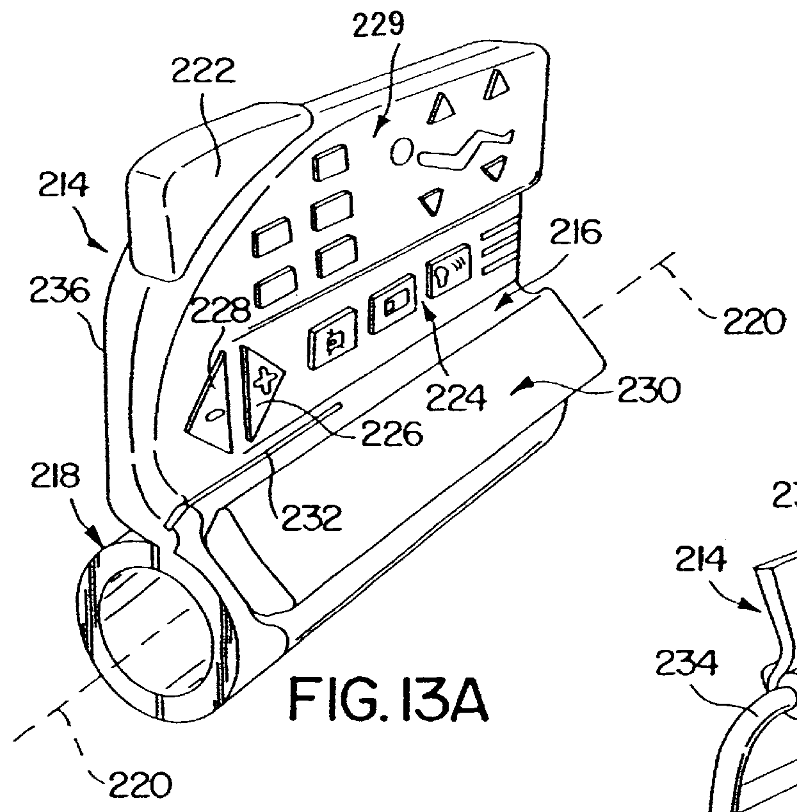
FIGS. 13A–19 illustrate additional embodiments of control units of the present invention.
Figure 13B:
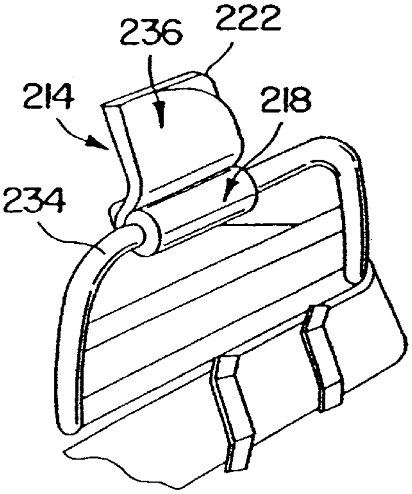

Another embodiment of a control unit 214 is illustrated in FIGS. 13A and 13B. As best illustrated in FIG. 13A, control unit 214 includes a body portion 216 having a generally cylindrical mounting tube portion 218 configured to mount the control unit 214 to a top rail on a siderail or other device for rotation about a longitudinal axis 220. Body portion 216 includes a nurse call switch 222 and separate function control switches 224 for T.V., radio, lighting, etc. Separate up and down control switches 226 and 228 are provided to adjust the functions once a particular function is selected using switches 222 as discussed above. Separate bed articulation control buttons 230 are formed on an upper portion of body 216. A phone 230 is located along mounting tube 218. A card reader slot 232 is provided above phone 230.

FIG. 13B illustrates the control unit 214 mounted to a top bar 234 of a siderail. Control buttons (not shown) are also located on surface 236 of control unit 214. Therefore, functions such as bed articulation functions may be used when the control unit 214 is pivoted downwardly to a storage position adjacent the siderail.

Figure 14:
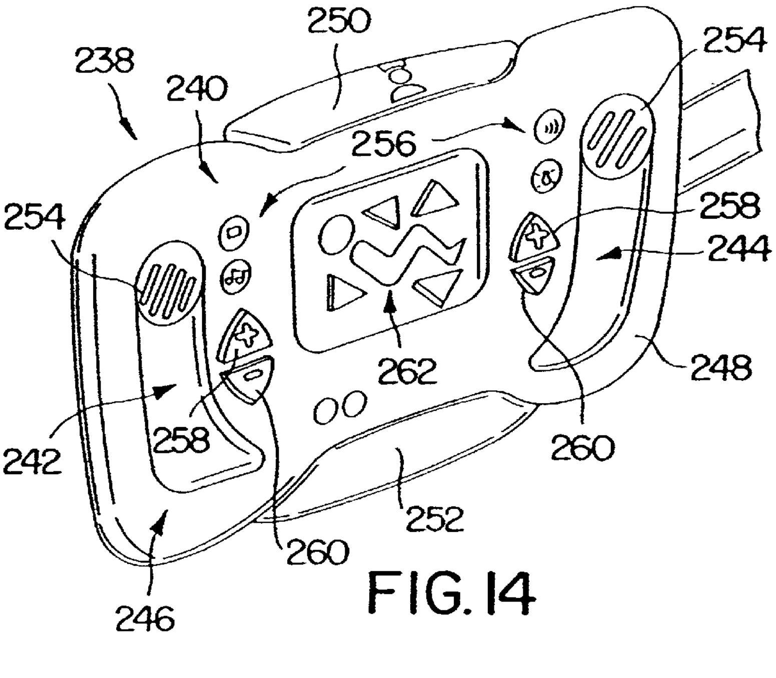

Another embodiment of a control unit 238 is illustrated in FIG. 14. Control unit 238 includes a body portion 240. Body portion 240 includes first and second apertures 242 and 244 configured to define first and second grip handles 246 and 248 to permit gripping of the control unit 238 from either side. A nurse call switch 250 is located along a top surface of the control unit 238 between the first and second grips 246 and 248. A reading light 252 is located on the control unit 238 between the first and second grips 246 and 248 as shown. Speakers 254 are located adjacent each of the grips 246 and 248. Control unit 238 further includes function selection switches 256, up and down control buttons 258 and 260, and bed articulation control buttons 262.

Figure 15:
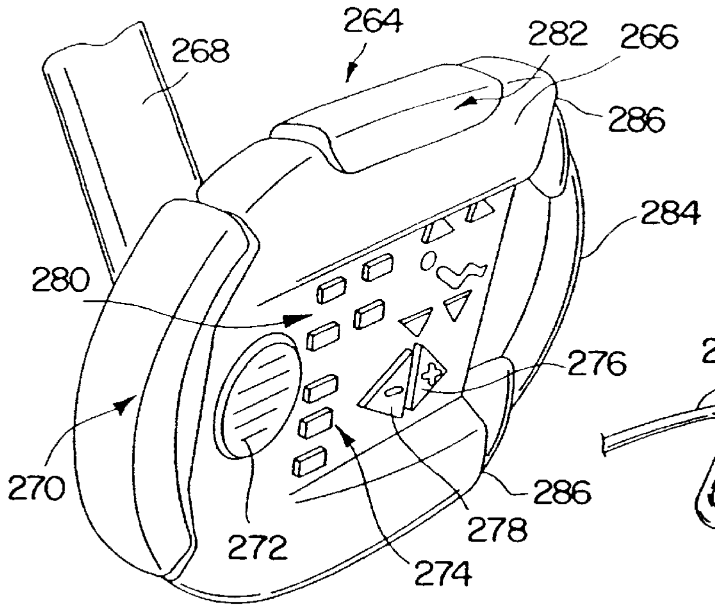
Figure 16:
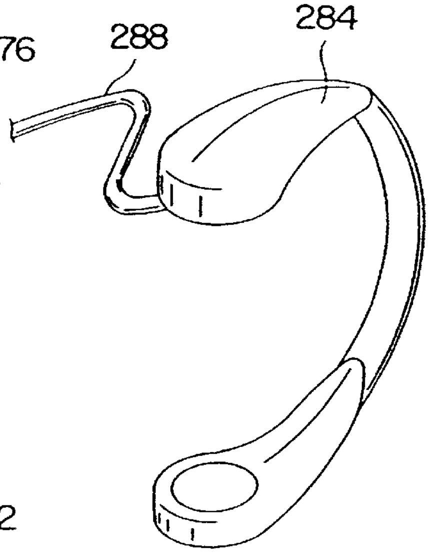

FIGS. 15 and 16 illustrate a further control unit 264. Control unit 264 includes a body portion 266 coupled to a control arm 268. Illustratively, arm 268 may be mounted to the headboard of the bed via a mechanical clip attachment. A telephone 270 is mounted to a first side of control unit 264. A speaker 272 and a microphone are also provided for hands-free telephone use. Separate function selection switches 274 and up and down control switches 276 and 278 are located on the body portion 266 of control unit 264. Bed articulation control switches 280 are also located on the body portion 266. A nurse call switch 282 is located on a top surface of control unit 264. A headphone 284 is stored within a receptacle 286 on a second side of the control unit 264 opposite from the phone 270. Illustratively, a retractable cord 288 connects the headphone 284 to the control unit 264. The removable headphone 284 may be used with the audio system for watching T.V. or listening to the radio. In addition, the headphone 284 may be used for hands-free telephone or for communication with the nurse station. A phone card reader slot is located beneath the phone 270.

Figure 17:
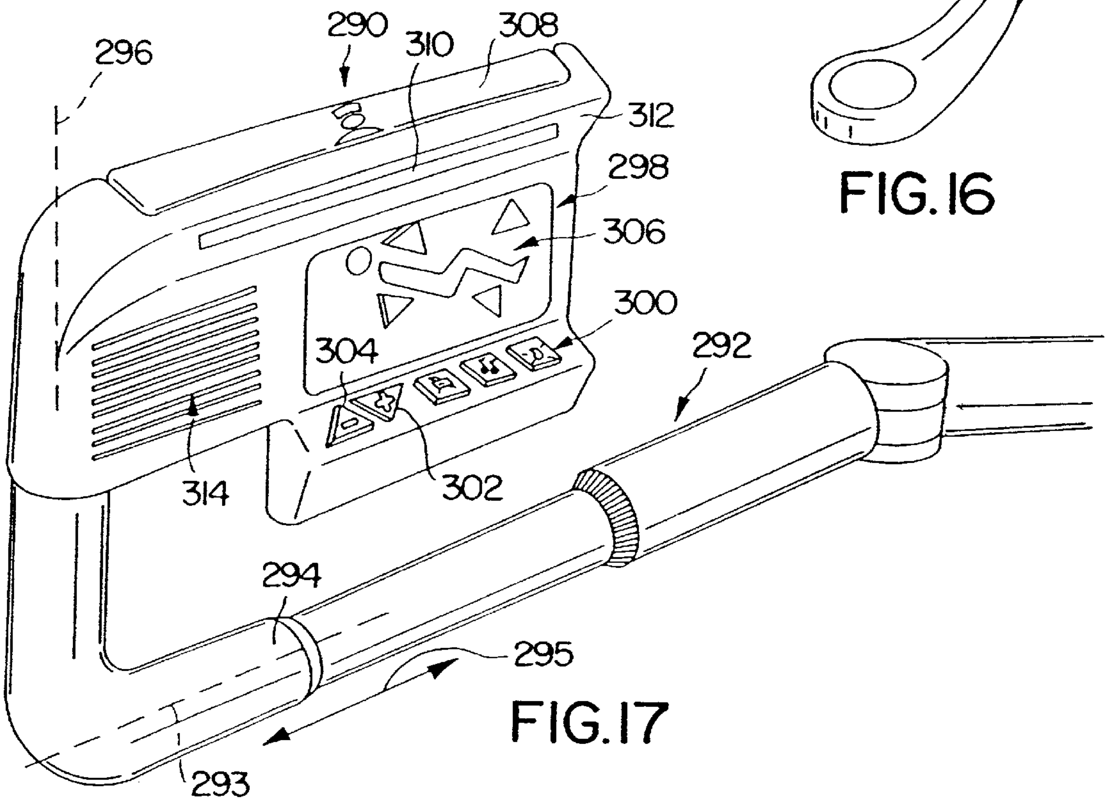

Another control unit 290 is illustrated in FIG. 17. Control unit 290 is mounted on arm assembly 292 having a telescoping and rotatable L-shaped member 294. L-shaped member 294 is rotatable about an axis 293 and movable back and forth in the direction of double-headed arrow 295 to adjust the length of the arm 292. Control unit 290 is mounted to an arm of the L-shaped member 294 and is rotatable about axis 296. Control unit 290 includes a body portion 298 having separate bed function selection switches 300. Up and down control buttons 302 and 304 are located adjacent the bed function selection switches 300. Bed articulation control switches 306 are also located on the control unit 290. Body portion 298 of control unit 290 is cantilevered from the arm of L-shaped member 294 so that the body portion 298 overhangs the horizontal support arm 292. A nurse call button 308 extends along a top surface of the control unit 290. A reading light 310 is located on a downwardly inclined surface 312 formed on the body portion 298. A speaker 314 is also located within the body portion.

Figure 18:
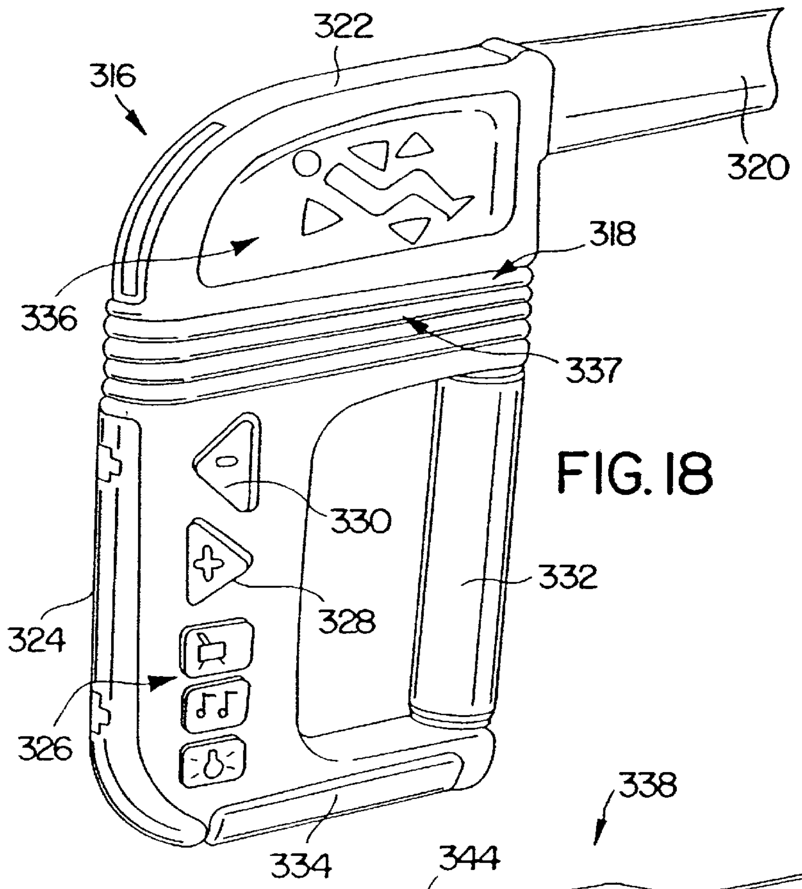

A further control unit 316 is illustrated in FIG. 18. Control unit 316 includes a body portion 318 mounted to an arm 320. Control unit 316 includes a first nurse call button 322 extending along a top edge and top corner of the body portion 318. A second nurse call button 324 extends along a side edge and bottom corner of the body portion 318. Separate function control selection switches 326 are provided for selecting functions to be controlled as discussed above. Up and down control switches 328 and 330 are located adjacent the function selection switches 326. Control unit 316 includes a handle 332 and a reading light 334 located along a bottom surface of body portion 318. Separate bed articulation control buttons 336 are provided. Control unit 316 further includes a speaker 337 located within the body portion 318.

Figure 19:
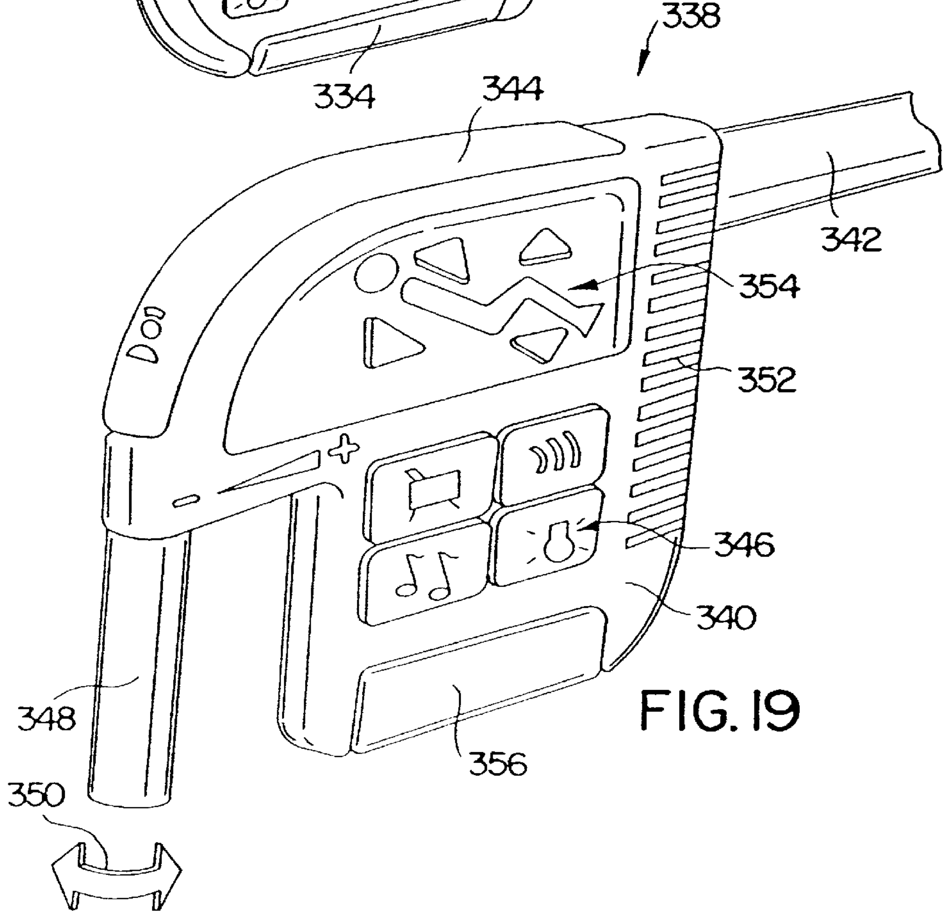

An additional control unit 338 is illustrated in FIG. 19. Control unit 338 includes a body portion 340. Body portion 340 is mounted to an arm 342. A nurse call switch 344 extends along a top surface and upper corner of the body portion 340 of the control unit 338. Separate function selection switches 346 are provided on the body portion 340 to select between various functions to be controlled. A handle 348 is coupled to the body portion 340. The handle is rotatable about its longitudinal axis as illustrated by double-headed arrow 350. Rotation of the handle 340 adjusts various selected functions similar to the up and down buttons discussed above. For instance, if a user wants to listen to the radio, the radio selection switch 346 is pressed. Once the radio function is chosen, the operator turns the handle to the left or the right to change stations. Once the station is selected, the radio switch 346 is again pressed. The handle 348 is then used to adjust the volume from a speaker 352 by turning the handle to the left or the right. The handle 348 illustratively rotates less than 360° and activates the up switch or the down switch in an arc based on appropriate ergonomics. The handle 348 is illustratively biased to the center position. Bed articulation control switches 354 are also located on the body portion 340. In addition, a reading light 356 is located on the control unit 338.

Figure 20:
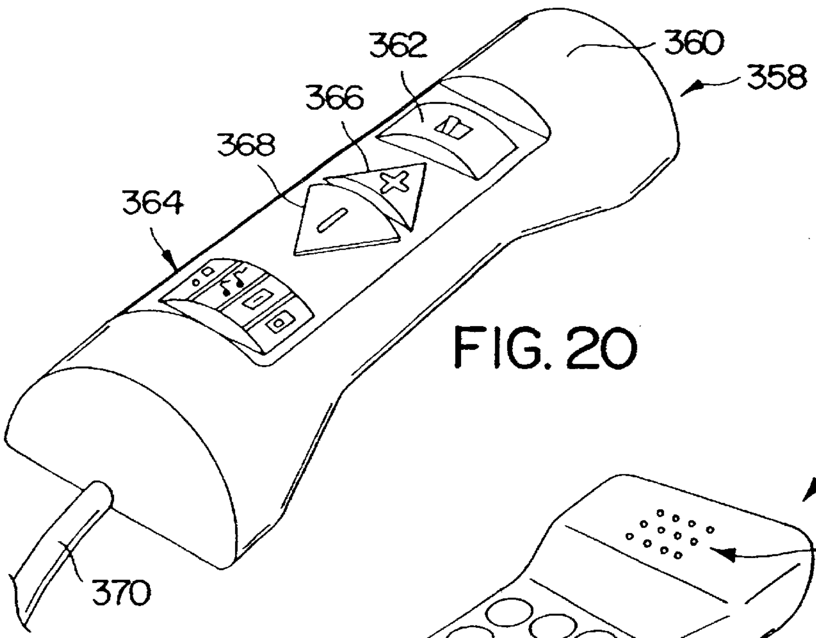
FIGS. 20 and 21 are perspective views of another control unit which includes a plurality of communication and bed function control buttons on one side of the control unit as shown in FIG. 20 and a telephone on the other side of the control unit as shown in FIG. 21.
Figure 21:
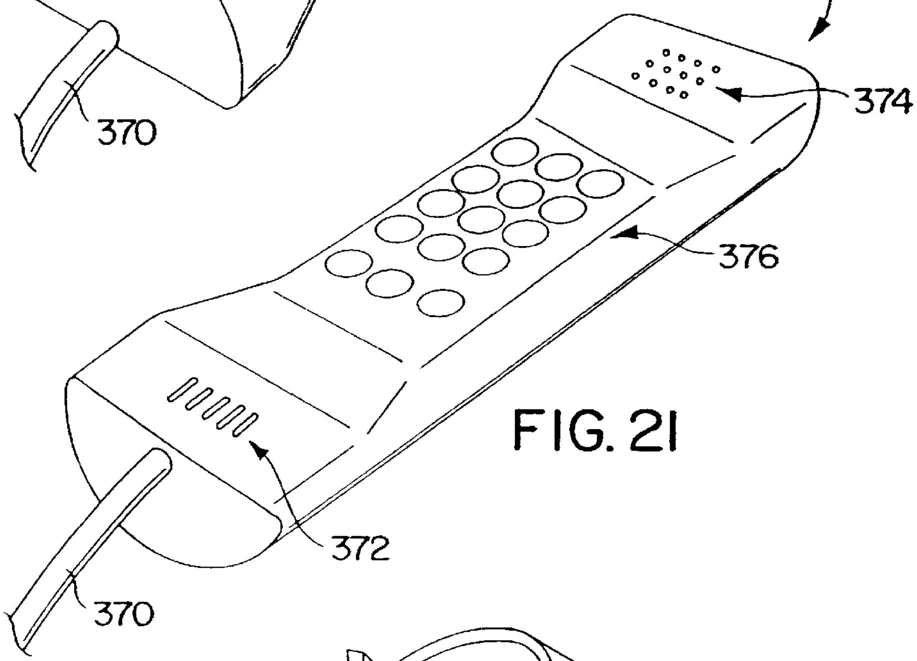
Figure 22:
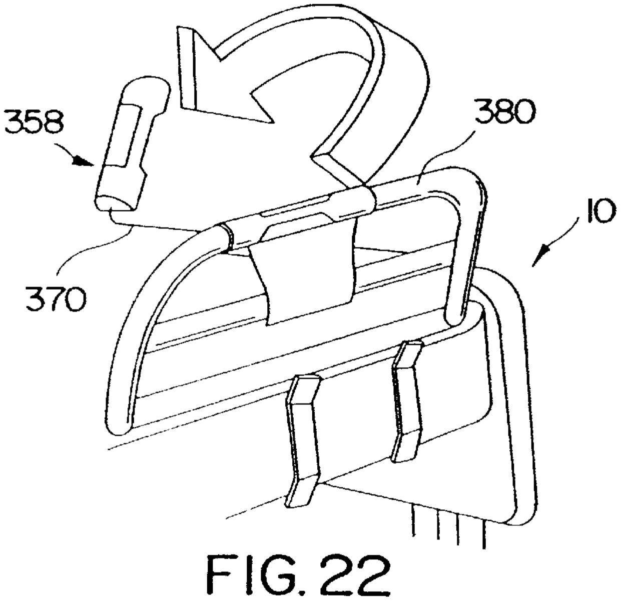
FIG. 22 illustrates the control unit of FIGS. 20 and 21 coupled to a siderail of a bed.

Another embodiment of the present invention is illustrated in FIGS. 20–22. A control unit 358 includes a body portion 360 having a nurse call switch 362, function selection switches 364, and up and down control switches 366 and 368. A cord 370 is connected to the control unit 358. A bottom side of the control unit 358 is illustrated in FIG. 21. The bottom side of the standard telephone handset including a microphone 372, a speaker 374, and a touch tone control pad 376. Bed articulation controls can also be located on the control unit 358, if desired. Control unit 358 is designed to be stored on a siderail 380 of a bed 10 as illustrated in FIG.

22. When in the storage position, the user can operate the control function switches. The control unit 358 is removed to use the telephone. Therefore, the control unit 358 is integrated with the bed 10 and bed function controls are located on the back side of the phone. A phone card slot is also located on the control unit 358. A retention mechanism on the siderail 380 is illustratively configured to hold the control unit 358 within the siderail 380. The control unit 358 may be held in place by a friction fit connector or by pins or levers which hold the control unit 358 in place and which are released by buttons or handles to remove the control unit 358.

Figure 23:
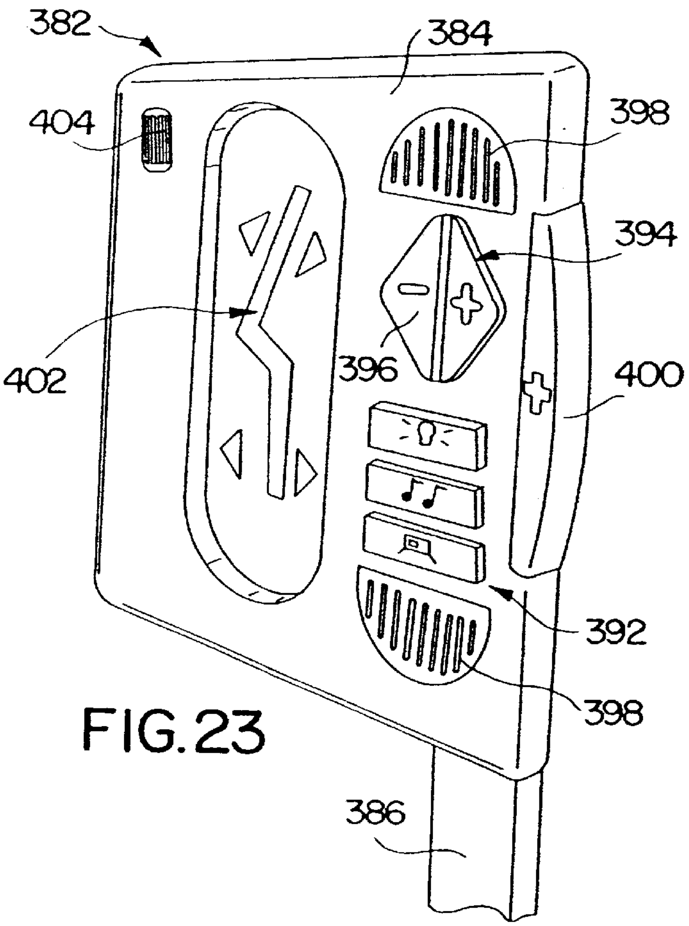
FIG. 23 illustrates another embodiment of a control unit in accordance with the present invention.
Figure 24:
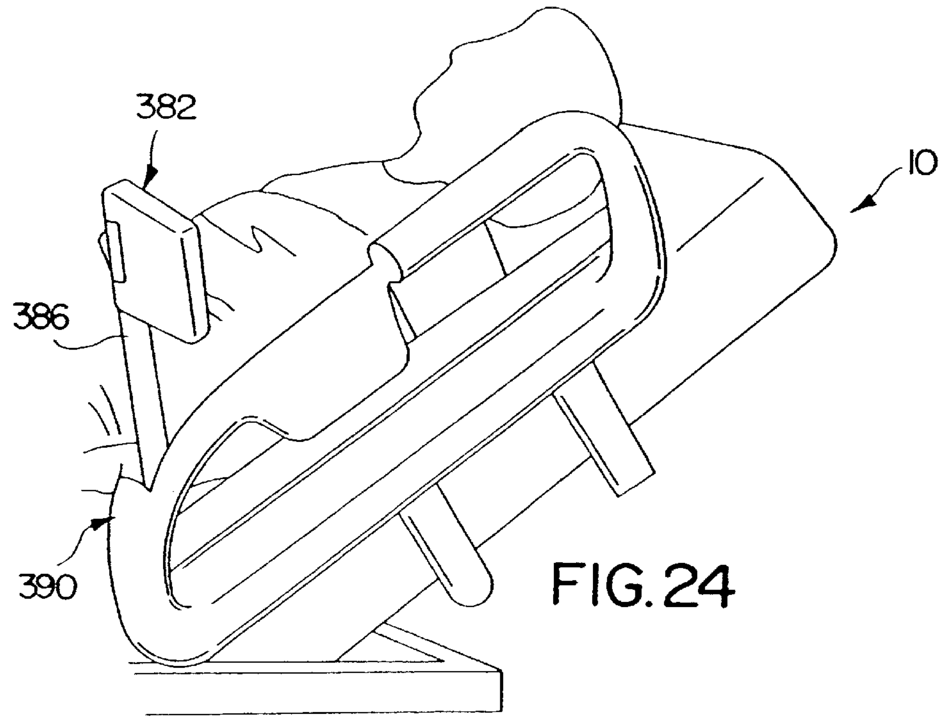
FIG. 24 illustrates the control unit of FIG. 23 pivotably mounted to a siderail of the bed.

Another control unit 382 is illustrated in FIGS. 23 and 24. Control unit 382 includes a body portion 384 mounted to an arm 386. Illustratively, the arm 386 is pivotably coupled to a siderail 390 as shown in FIG. 24. The arm is movable from an upright position shown in FIG. 24 to a downwardly pivoted storage position in which the control unit 382 is nested within the siderail 390.

The control unit 382 includes separate function selection switches 392. Up and down control switches 394 and 396 are also located on the body portion 384. Speakers 398 are also located on the body portion 384. A nurse call switch 400 is located along a side of the control unit 382. Separate bed articulation control switches 402 are also provided. A microphone 404 is included for hands-free telephone and nurse communications.

Figure 25:
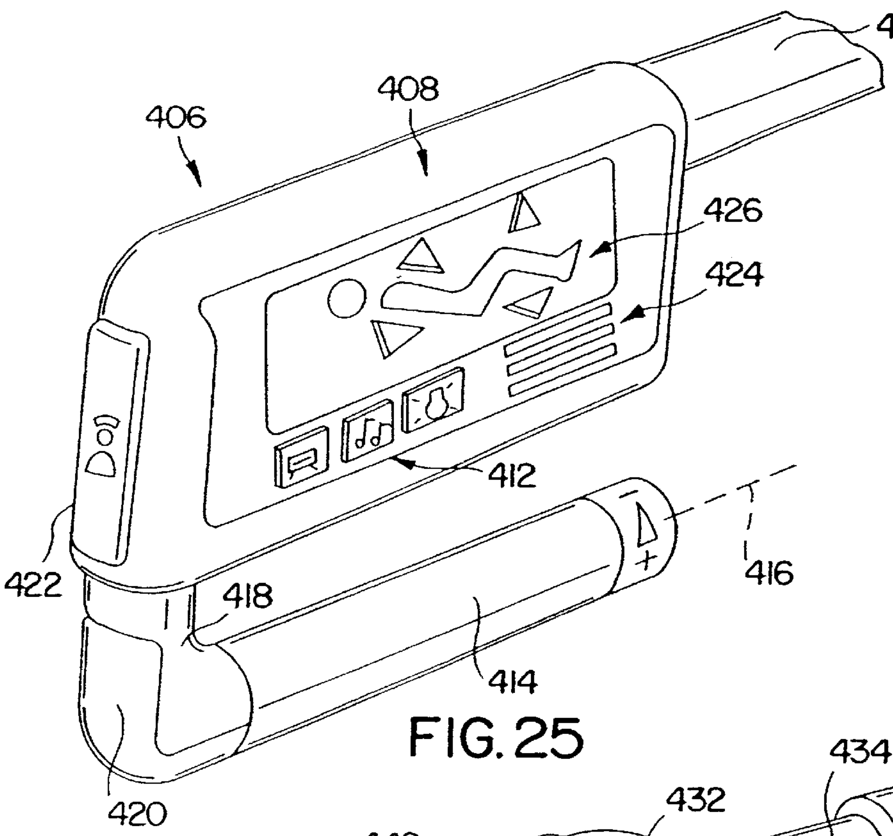
FIGS. 25–27 illustrate further embodiments of control units of the present invention.

Yet another control unit 406 is illustrated in FIG. 25. Control unit 406 includes a body portion 408 mounted to a support arm 410. Separate function selection switches 412 are located on the body portion 408. A handle 414 is rotatable about axis 416 to provide high/low or up/down control for each function selected similar to the handle 348 discussed above with reference to FIG. 19. The handle 414 is coupled to an L-shaped connector member 418 extending downwardly from body portion 408. A light 420 is formed on a corner of the L-shaped member 418. A nurse call switch 422 is located on a side edge of the body portion 408. Nurse call 422 may also be located along a top surface of body portion 408, if desired. A speaker 424 and separate bed articulation controls 426 are also located on the body portion 408 of control unit 406. The handle 414 is located in a generally horizontal orientation when in use. The handle 414 permits the operator to move the control unit 406 as well as to adjust the control functions in a manner similar to up and down switches discussed above.

Figure 26:
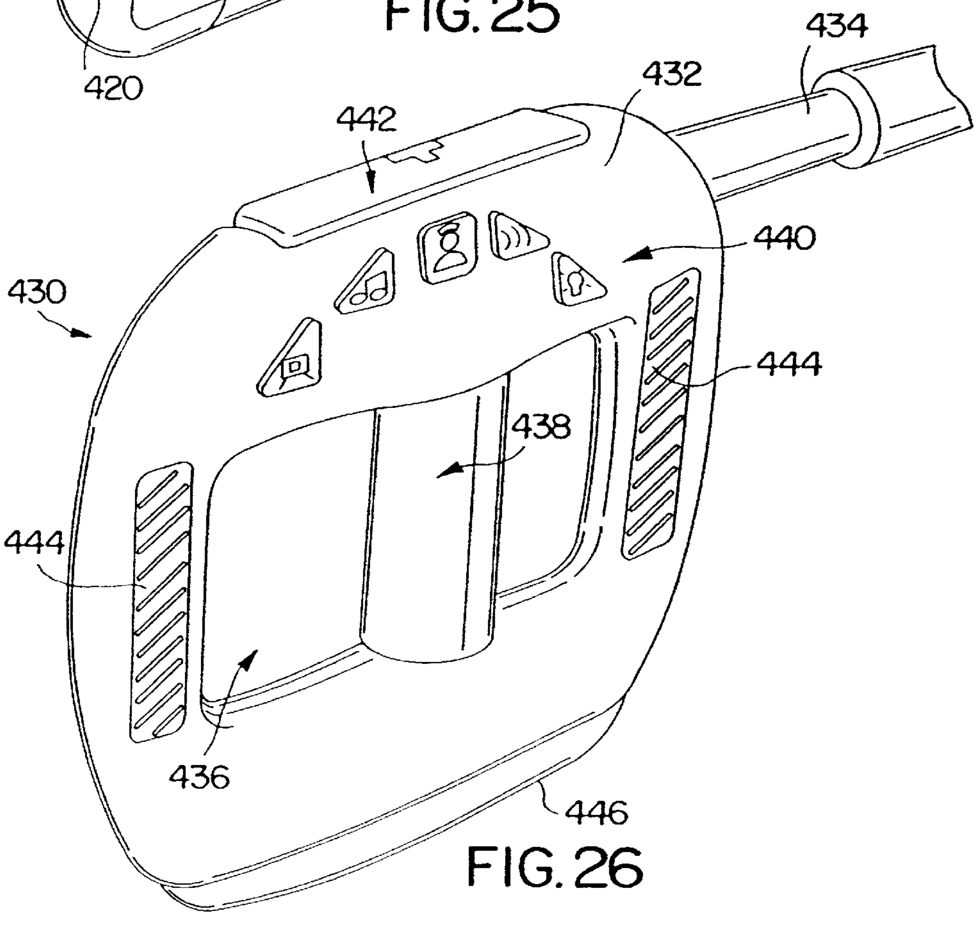

Another control unit 430 is illustrated in FIG. 26. Control unit 430 includes a body portion 432 mounted to a control arm 434. Body portion 432 includes a central aperture 436 and a rotatable grip portion 438. Grip portion 438 is used to adjust the high/low or up/down controls. Separate function selection switches 440 are located on the body portion 432. A nurse call switch 442 is located along a top surface of the body portion 432. Speakers 444 are located on opposite sides of the body portion 432. In this embodiment, the rotatable control grip 438 is located in a center portion of the control unit 432. A light 446 is also coupled to the body portion 432.

Figure 27:
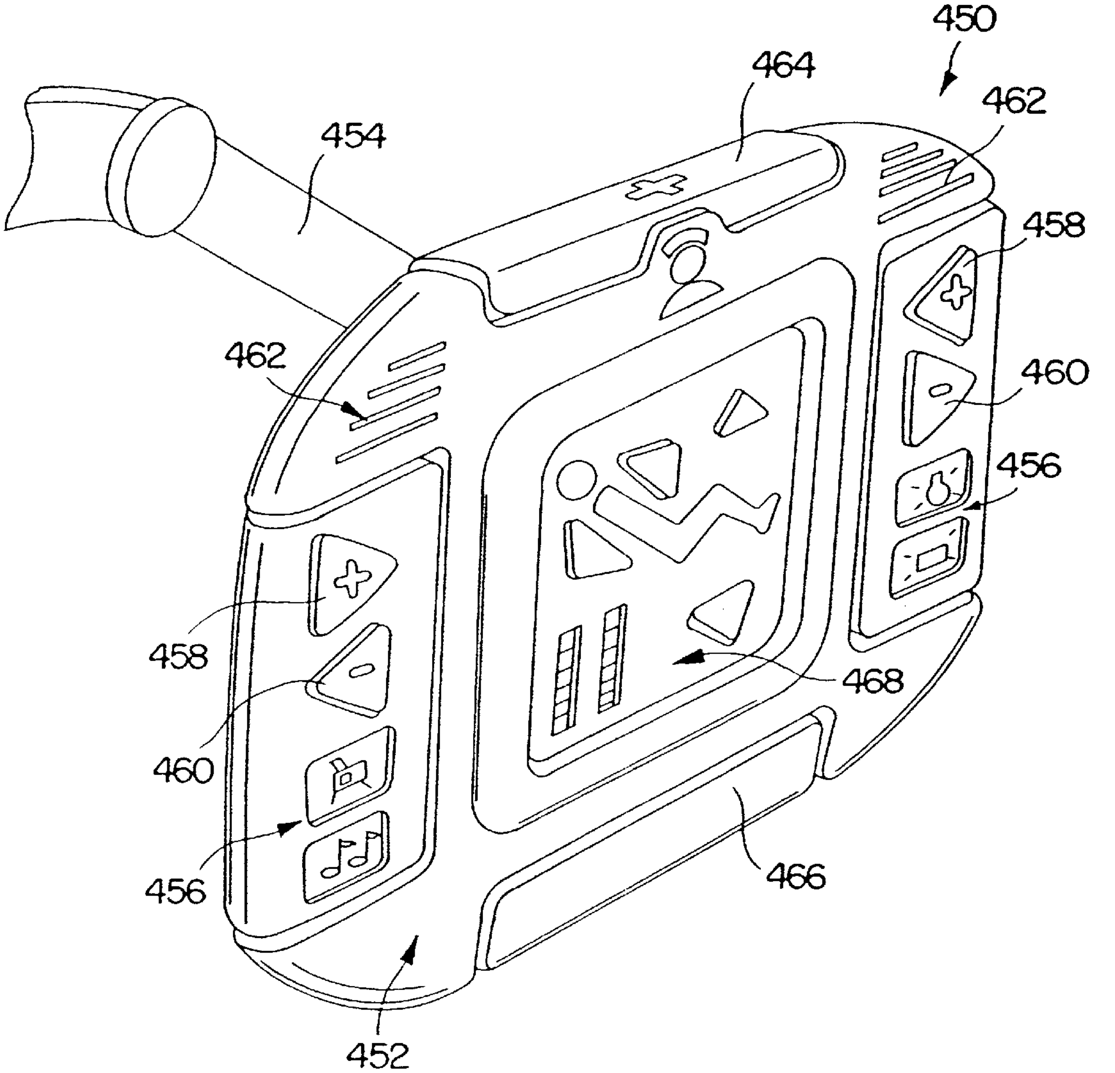

Yet another embodiment of the control unit 450 is illustrated in FIG. 27. Control unit 450 includes a body portion 452 mounted to an arm 454. Control unit 450 includes separate function control switches 456 and two pairs of up and down controls 458 and 460 on opposite sides of the control unit 450. Speakers 462 are located near a top portion of control unit 450. A nurse call switch 464 is located along a top surface of control unit 450. A light 466 is located along a bottom portion of control unit 450.

A touch screen control panel 468 is located in a center portion of control unit 450. A control screen 468 provides flexibility for controlling various types of menu driven functions. Different programs may be installed for operation of different functions. The screen 468 is also used for connection to an Internet site to play video game products. A computer mouse control apparatus or keyboard may be connected to the control unit, if desired. In addition, the control buttons on the control unit 450 may be used to control connection to the Internet or the video games. Control screen 468 may be a television screen, computer screen, or touch screen control panel.

Figure 28:
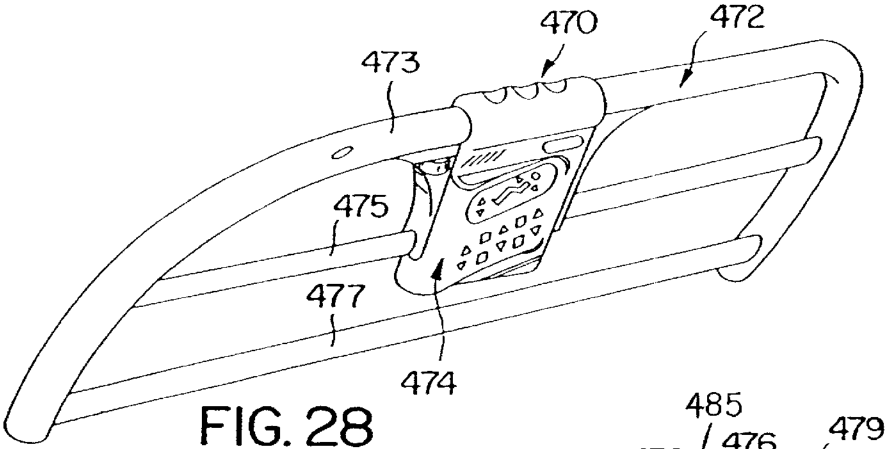
FIG. 28 illustrates yet another control unit mounted on a bed siderail.
Figure 29:
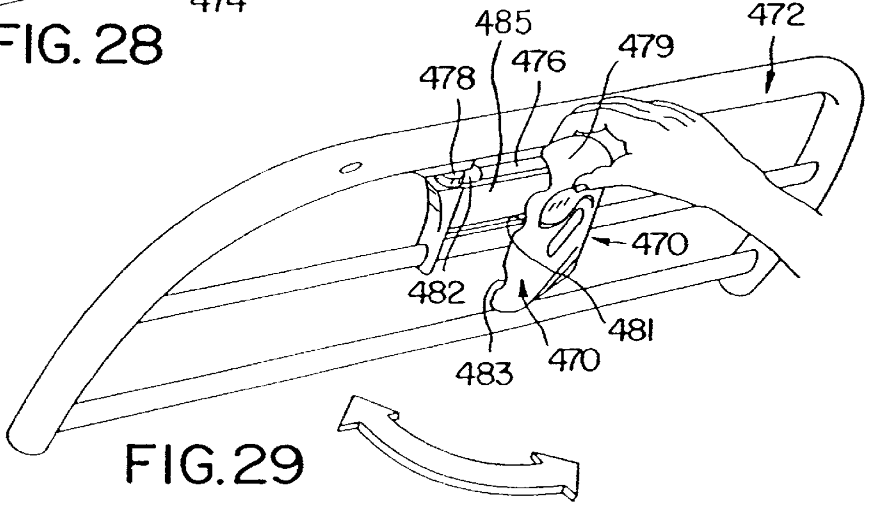
FIG. 29 illustrates pivotable movement of the control unit of FIG. 28 relative to the siderail.
Figure 30:
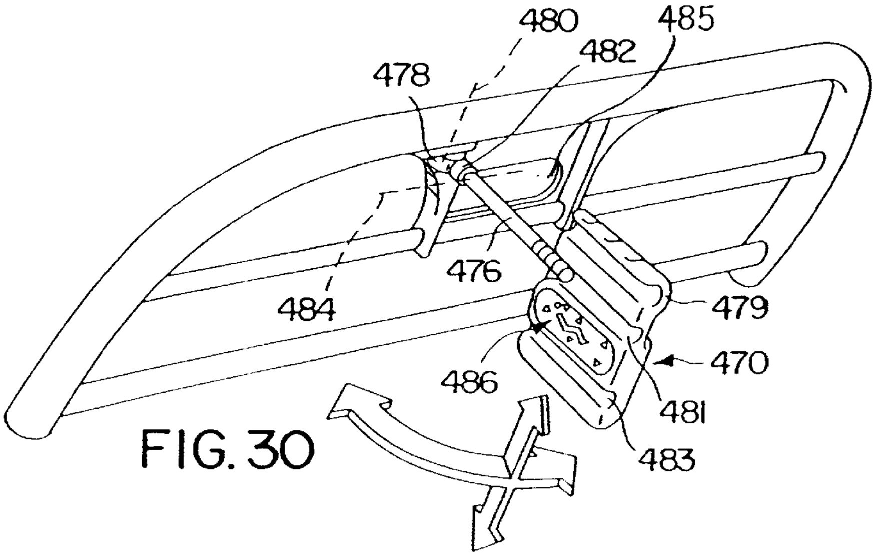
FIG. 30 illustrates the control unit fully pivoted away from the siderail by a pivot arm apparatus.
Figure 31:
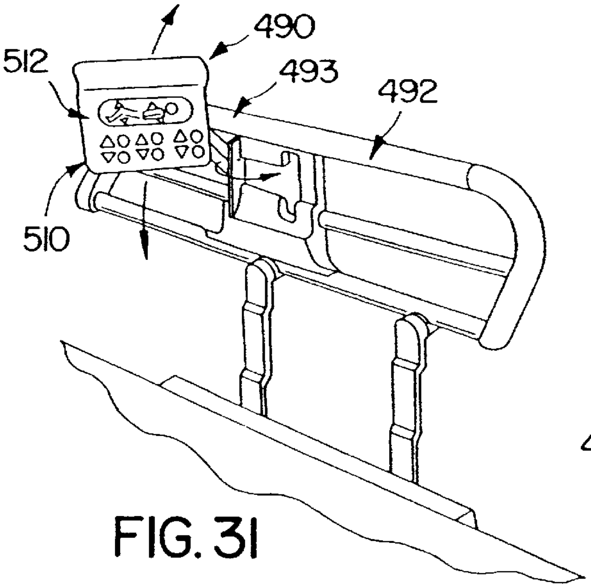
FIGS. 31–35 illustrate another embodiment of a siderail mounted control unit.

FIGS. 28–30 illustrate a siderail mounted control unit 470. The control unit 470 is configured to be integrated with the siderail 472. In a nested storage position shown in FIG. 28, the control unit 470 is located adjacent the siderail. Control buttons 474 to control functions of the bed or room, bed articulation, nurse call, telephone, etc. are integrated into the control unit 470 in the manner discussed above. The control buttons 474 are located on a generally planar surface of the control unit 470 that is aligned at a transverse angle relative to a plane of the siderail 472. Therefore, the control buttons 474 are aligned at an angle toward the head of the person on the bed 10.

An operator can grip the control unit 470 and pivot control unit 470 outwardly from the siderail 472 as illustrated in FIG. 29. As shown in FIG. 30, a support arm 476 is pivotably coupled to the siderail 472. A first pivot connection is configured to connect the arm 476 to the siderail 472 about pivot axis 480. A sleeve 482 is rotatably coupled to mounting portion 478. Arm 476 is pivotably coupled to sleeve 482 about axis 484. Therefore, arm 476 can move up and down and forward and backward relative to the siderail 476 as shown in FIG. 30. An opposite end of arm 476 is pivotably coupled to the control unit 470. Control unit 470 includes additional controls 486 on an opposite side of the control unit 470 from controls 474 for use when the control unit 470 is in its outwardly extended position as shown in FIG. 30. Controls 486 are accessible through opening 485 (FIG. 30) to a caregiver positioned adjacent the bed when control unit 470 is in the nested storage position as shown in FIG. 28. The illustrated siderail 472 includes a cylindrically shaped top rail 473, a center rail 475 and a bottom rail 477. The control unit 470 includes a curved top surface 479 configured to receive the curved profile surface of the top rail 471. The control unit 470 also includes first and second recessed portions 481 and 483. The first recessed portion 481 is configured to receive the arm 476 when the control unit 470 is moved to the nested storage position of FIG. 28. The second recessed portion 483 is configured to receive the center rail when the control unit 470 is moved to the storage position of FIG. 28.

Figure 33:
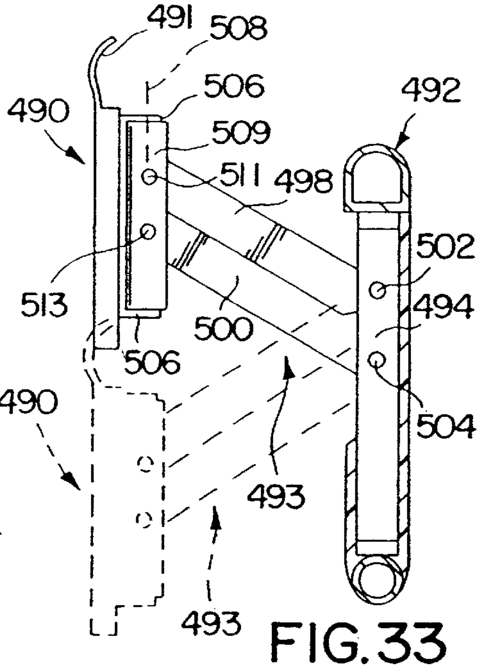
Figure 32:
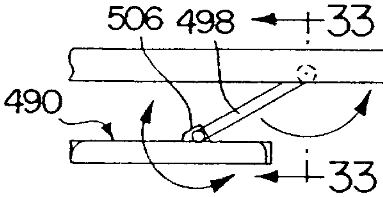
Figure 34:
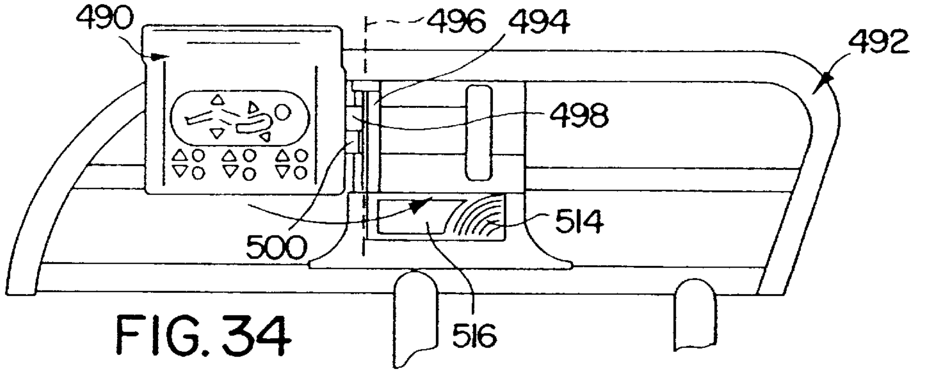
Figure 35:
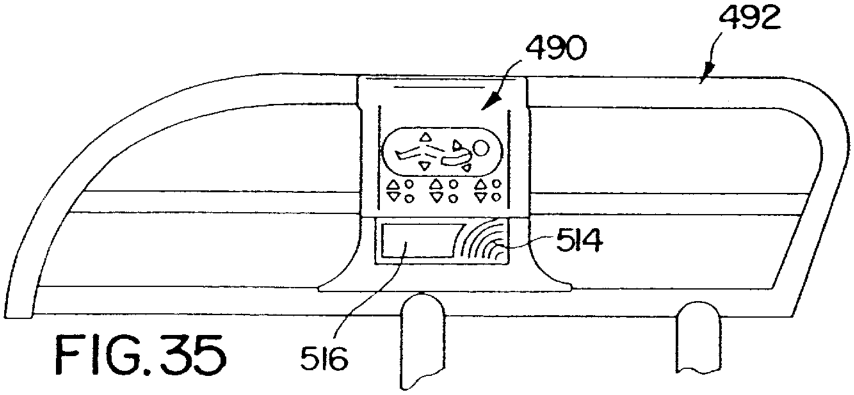

Another embodiment of the present invention similar to FIGS. 28–30 is illustrated in FIGS. 31–35. A different type of pivot linkage 493 is used to connect a control unit 490 to a siderail 492. A support channel 494 of linkage 493 is pivotably coupled to the siderail 492 about axis 496. First and second arms 498 and 500 are pivotably coupled to support channel 494 by pivot connections 502 and 504, respectively. Arms 498 and 500 can move up and down about pivot axes 502 and 504, respectively, as illustrated in FIG. 33 to raise and lower the control unit 490 relative to the siderail 492. Arms 498 and 500 are also pivotably coupled to flanges 506 on the control unit 490 by connector 509. Therefore, control unit 490 can rotate about axis 508 relative to arms 498 and 500. Arms 498 and 500 also pivot about pivot connections 511 and 513 coupled to connector 509. Linkage 493 therefore permits the control unit 490 to move forward and backward and up and down relative to the siderail 492. Illustratively, control unit 490 includes function control buttons 510 and bed articulation control buttons 512. A speaker 514 is coupled to the siderail 492. A light 516 is located adjacent the speaker 514. The control unit 490 includes a curved top surface 491 configured to receive the curved profile surface of the top rail of siderail 492.

Figure 36:
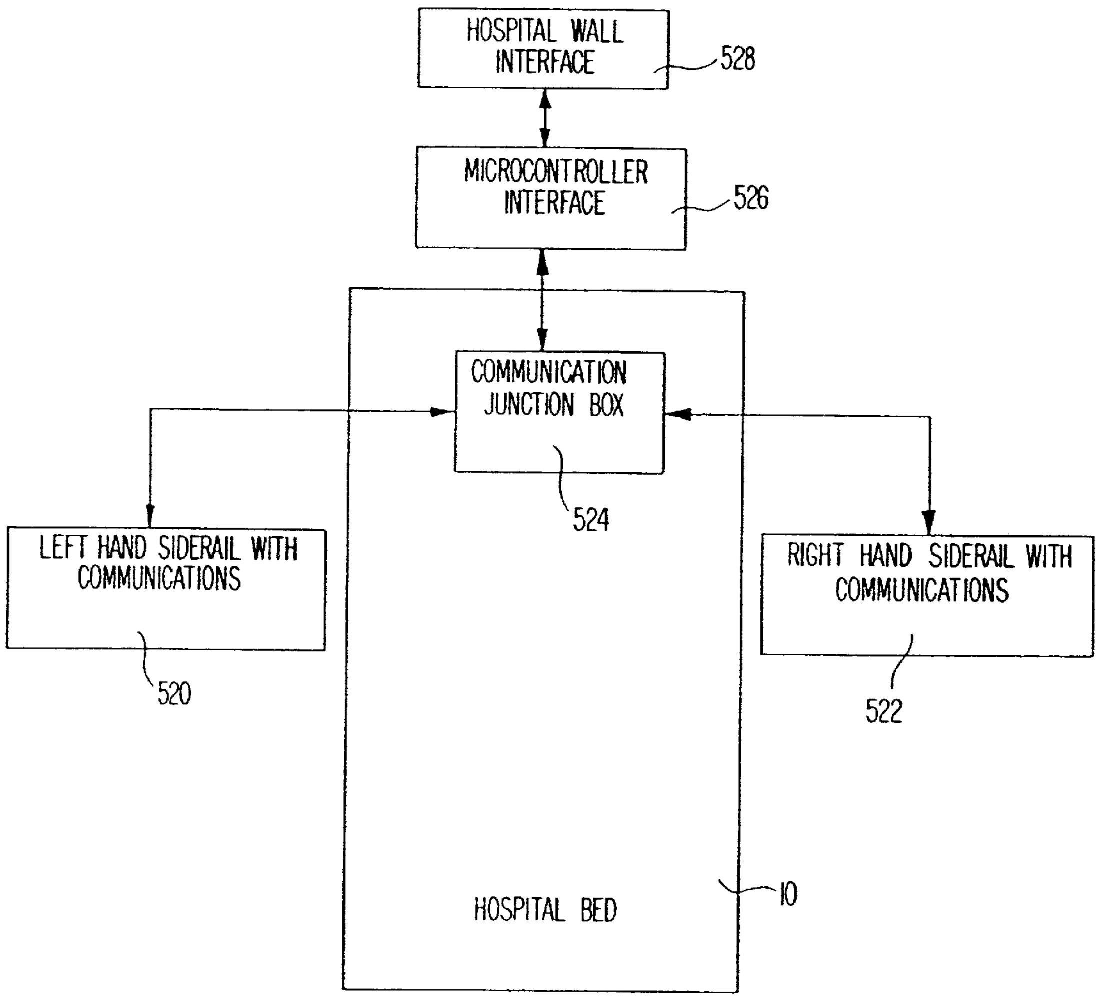
FIG. 36 is a block diagram of a connection to a nurse call system.

FIG. 36 is a block diagram illustrating connection of the various control units to a nurse call interface on the wall of the hospital room. The control units may be either on the left hand or right hand siderail as illustrated at blocks 520 and 522. The control units are coupled to a communication junction box 524 on the hospital bed 10. Junction box 524 is coupled to a microcontroller interface 526 which is coupled to a nurse call interface located on the hospital wall as illustrated at block 528. Therefore, the control units of the present invention can communicate with the nurse call system and/or with the electrical communication network of the hospital to transmit and receive information from remote locations.

Although the invention has been described in detail with reference to a certain illustrated embodiment, variations and modifications exist within the scope and spirit of the invention as described and as defined in the following claims.

What is claimed is:

1. A communication and control apparatus for use by a person located on a bed to control at least one function, the bed including a frame, a patient support surface supported by the frame, and a siderail coupled to the frame and configured to extend above the patient support surface, the apparatus comprising:

a control unit including a receiving portion and configured to control the at least one function;

an extendable arm having a first end pivotally coupled to the siderail and a second end pivotally coupled to the control unit, the arm being configured to support the control unit above the patient support surface; and wherein the arm is configured to be received within the receiving portion of the control unit when in a storage position, and the arm is configured to extend away from the receiving portion of the control unit when in an extended position.

2. The communication and control apparatus of claim 1, wherein the control unit is configured to removably couple to the siderail when in the storage position.

3. The communication and control apparatus of claim 1, wherein the siderail includes a first rail vertically spaced apart from a second rail, and the control unit includes receiving portions configured to removably receive portions of the first rail and the second rail when the control unit is in the storage position.

4. The communication and control apparatus of claim 1, wherein the siderail includes a rail, and the control unit includes a first receiving portion configured to receive the arm and a second receiving portion configured to receive a portion of the rail when the control unit is in the storage position.

5. The communication and control apparatus of claim 1, wherein the siderail includes an opening and the control unit includes control buttons which are accessible through the opening such that a health care provider positioned adjacent the bed is provided access to the control buttons when the control unit is in the storage position.

6. The communication and control apparatus of claim 5, wherein the control unit includes a first side, an opposing second side, and first and second control buttons configured to actuate the at least one function, the first and second control buttons positioned on the first and second opposing sides of the control unit, respectively, the first side facing towards the patient located on the bed, and the second side facing towards the opening in the siderail.

7. A communication and control apparatus for use by a person located on a bed to control at least one function, the bed including a frame, and a patient support surface supported by the frame, the apparatus comprising:

a siderail coupled to the frame and configured to extend above the patient support surface, the siderail defining a recessed portion;

a control unit configured to control the at least one function, the control unit being removably received in the recessed portion;

an arm having a first end and a second end, the arm being configured to support the control unit above the patient support surface;

a first connection configured to operably connect the first end of the arm to the siderail; and a second connection configured to operably connect the second end of the arm to the control unit, the first connection and the second connection cooperating to permit movement of the control unit and the arm from a storage position within the recessed portion in the siderail to an extended position extending away from the siderail.

8. The communication and control apparatus of claim 7, wherein the recessed portion is defined between a top rail and a bottom rail of the siderail.

9. The communication and control apparatus of claim 7, wherein the control unit is accessible to the patient in both the storage position and the extended position.

10. The communication and control apparatus of claim 7, wherein the control unit includes a first side and an opposing second side, the first side including a first control button positioned to face a patient located on the patient support surface and configured to actuate the at least one function, the second side including a second control button configured to control the at least one function.

11. The communication and control apparatus of claim 10, wherein the second control button is accessible through an opening in the siderail to a health care provider positioned adjacent the bed when the control unit is in the storage position.

12. A communication and control apparatus for use by a person located on a bed to control at least one function, the bed including a frame, a patient support surface supported by the frame, and a siderail coupled to the frame and configured to extend above the patient support surface, the apparatus comprising:

a controller configured to control the at least one function; and a housing surrounding the controller, the housing being formed to include a recess configured to removably receive a portion of the siderail.

13. The communication and control apparatus of claim 12, wherein the recess is substantially U-shaped.

14. The communication and control apparatus of claim 12, wherein the siderail includes a first rail vertically spaced apart from a second rail, and the housing includes receiving portions configured to removably receive portions of the first and second rails.

15. The communication and control apparatus of claim 12, further comprising an arm having a first end and a second end, the first end coupled to the siderail and the second end coupled to the housing, the arm being configured to support the housing above the patient support surface.

16. The communication and control apparatus of claim 15, further comprising a first pivot connection configured to operably connect the first end of the arm to the siderail for pivoting movement.

17. The communication and control apparatus of claim 16, further comprising a second pivot connection configured to operably connect the second end of the arm to the control unit for pivoting movement.

18. The communication and control apparatus of claim 17, wherein the first pivot connection and the second pivot connection cooperate to facilitate movement of the housing and the arm from a storage position where the housing receives a portion of the siderail to an extended position where the housing and the arm extend away from the siderail.

19. A communication and control apparatus for use by a person located on a bed to control at least one function, the bed including a frame, a patient support surface supported by the frame, a siderail coupled to the frame and configured to extend above the patient support surface, the apparatus comprising:

a housing including a first side facing a first direction and a second side facing a second direction generally opposite the first direction, the housing being moveable between a first position removably coupled to the siderail and a second position detached from the siderail;

a switch supported by the first side and configured to control the at least one function;

a communication device supported by the second side, the communication device being inactive in the first position and active in the second position; and a communication link between the control unit and the siderail.

20. The communication and control apparatus of claim 19, wherein the communication link comprise a cord attached on a first end to the communication device and attached on a second end to the siderail, the cord being configured to carry a signal from the communication device to a signal receiving unit on the bed.

21. The communication and control apparatus of claim 19, wherein the housing is configured to nest within the siderail.

22. The communication and control apparatus of claim 19, wherein the communication device is a telephone.

23. The communication and control apparatus of claim 19, wherein a nurse call button is included on the first side of the housing.

24. A communication and control apparatus for use by a person located on a patient support surface of a bed, the apparatus comprising:

a control unit including a switch configured to control one of the bed and another piece of equipment;

a device coupled to the control unit and configured to permit voice communication with another person; and a cord coupled to the control unit and to a location on the bed, the cord having sufficient length to allow the control unit to be moved between a plurality of positions on the patient support surface.

25. The communication and control apparatus of claim 24, wherein the device configured to facilitate voice communication with another person is a telephone.

26. The communication and control apparatus of claim 24, wherein the device configured to facilitate voice communication with another person is an intercom.

27. The communication and control apparatus of claim 24, wherein the switch is positioned on a first side of the control unit and the device configured to facilitate voice communication with another person is positioned on a second side of the control unit.

28. The communication and control apparatus of claim 24, wherein the cord remains coupled to the location on the bed as the control unit is moved between the plurality of positions on the patient support surface.

29. The communication and control apparatus of claim 24, wherein the control unit is configured to removably couple to a siderail.

30. The communication and control apparatus of claim 24, wherein the cord is configured to carry a signal from the control unit to a signal receiving unit on the bed.

31. A communication and control apparatus for use by a person located on a bed to control at least one function, the bed including a frame, a patient support surface supported by the frame, the apparatus comprising:

a siderail coupled to the frame and configured to extend above the patient support surface, the siderail including substantially vertical first and second members defining a gap;

a control unit configured to control the at least one function, the control unit configured to be removably received within the gap and provide a portion of the siderail;

an arm having a first end and a second end, the arm being configured to support the control unit above the patient support surface; and wherein the first end and the second end of the arm cooperate to permit movement of the control unit and the arm from a first position where the control unit is received within the gap in the siderail to a second position where the control unit and the arm extend away from the siderail.

32. The communication and control apparatus of claim 31, wherein the control unit includes a first side and an opposing second side, the first side including a first control button positioned to face a patient positioned on the patient support surface and configured to actuate the at least one function, the second opposing side including a second control button configured to control the at least one function.

33. The communication and control apparatus of claim 31, wherein the first and second members of the siderail each include a channel configured to removably receive the control unit.

34. The communication and control apparatus of claim 31, wherein the arm includes a first pivot connection configured to operably connect the first end of the arm to the siderail for pivoting movement.

35. The communication and control apparatus of claim 34, wherein the arm includes a second pivot connection configured to operably connect the second end of the arm to the control unit for pivoting movement.

36. A control apparatus for use by a person located on a bed to control at least one function, the bed including a frame, and a patient support surface supported by the frame, the apparatus comprising:

a control unit configured to control the at least one function;

a selection switch configured to select the at least one function, the switch supported by the control unit; and a handle portion including a longitudinal axis, the handle portion supported by the control unit for rotation about the longitudinal axis and configured to control the function selected using the selection switch.

37. The control apparatus of claim 36, wherein the rotatable handle portion is configured to change the intensity of the at least one function.

38. The control apparatus of claim 36, wherein the control unit is supported by an arm supported by the bed.

39. The control apparatus of claim of claim 38, wherein the arm is pivotally coupled on a first end to the control unit and pivotally coupled on a second end to the bed.

40. The control apparatus of claim 39, wherein the control unit is configured to nest within a siderail supported by the frame.

41. The control apparatus of claim 36, wherein handle is spaced apart from the control unit.

* * * * *